United States Patent
Khosropour et al.

(10) Patent No.: US 10,673,691 B2
(45) Date of Patent: Jun. 2, 2020

(54) USER INTERACTION PLATFORM

(71) Applicants: Fred Khosropour, San Jose, CA (US);
Maryam Najafi, San Jose, CA (US);
Joseph Acayan, Soquel, CA (US)

(72) Inventors: Fred Khosropour, San Jose, CA (US);
Maryam Najafi, San Jose, CA (US);
Joseph Acayan, Soquel, CA (US)

( * ) Notice: Subject to any disclaimer, the term of this patent is extended or adjusted under 35 U.S.C. 154(b) by 0 days.

(21) Appl. No.: 13/833,682

(22) Filed: Mar. 15, 2013

(65) Prior Publication Data
US 2014/0108936 A1 Apr. 17, 2014

Related U.S. Application Data

(60) Provisional application No. 61/615,206, filed on Mar. 24, 2012.

(51) Int. Cl.
*H04L 12/24* (2006.01)
*G06F 9/451* (2018.01)

(52) U.S. Cl.
CPC .......... *H04L 41/0803* (2013.01); *G06F 9/451* (2018.02)

(58) Field of Classification Search
CPC ..... H04L 41/22; H04L 41/12; H04L 29/0899; H04L 41/0803; H04M 1/72527; H04M 1/0206; G06F 3/04886; G06F 9/4443; G06F 9/451
USPC ........................................................ 715/735
See application file for complete search history.

(56) References Cited

U.S. PATENT DOCUMENTS

| | | | |
|---|---|---|---|
| 2006/0041655 A1* | 2/2006 | Holloway et al. ............. 709/223 |
| 2009/0083411 A1* | 3/2009 | Takano .................... G06F 15/16 709/224 |
| 2009/0161027 A1* | 6/2009 | Hardacker ............. G08C 17/02 348/734 |
| 2010/0017736 A1* | 1/2010 | Kim ........................ G08C 17/02 715/771 |
| 2010/0138764 A1* | 6/2010 | Hatambeiki ..... H04N 21/42208 715/765 |
| 2010/0239081 A1* | 9/2010 | Krantz ................. H04M 11/066 379/207.02 |
| 2011/0001700 A1* | 1/2011 | Yoav ..................... G06F 3/0489 345/157 |
| 2011/0072373 A1* | 3/2011 | Yuki .................... G06F 3/04817 715/764 |
| 2011/0128216 A1* | 6/2011 | Renwick ............... G06F 1/1618 345/156 |
| 2011/0138310 A1* | 6/2011 | Gomez et al. ................ 715/769 |
| 2011/0167370 A1* | 7/2011 | Kim .................... G06F 3/04883 715/769 |
| 2011/0173542 A1* | 7/2011 | Imes et al. .................... 715/735 |
| 2012/0030619 A1* | 2/2012 | Lee ........................ G06F 3/0482 715/810 |
| 2012/0068857 A1* | 3/2012 | Rothkopf et al. ....... 340/870.07 |
| 2012/0178431 A1* | 7/2012 | Gold ............................ 455/420 |

(Continued)

*Primary Examiner* — Anil K Bhargava
(74) *Attorney, Agent, or Firm* — Joseph L. Acayan

(57) ABSTRACT

Implementations generally relate to a user interaction platform. In some implementations, a method includes providing one or more target functions to a user interaction device, where the one or more target functions enable user interaction with a primary device. The method also includes receiving user-defined configuration information for the one or more target functions. The method also includes configuring the one or more target functions based on the user-defined configuration information.

18 Claims, 12 Drawing Sheets

(56) References Cited

U.S. PATENT DOCUMENTS

| | | | |
|---|---|---|---|
| 2012/0210268 A1* | 8/2012 | Hilbrink | G06F 3/0482 |
| | | | 715/773 |
| 2013/0082840 A1* | 4/2013 | Kumar | H04M 1/0202 |
| | | | 340/540 |
| 2013/0085705 A1* | 4/2013 | Jano | H04M 1/0208 |
| | | | 702/127 |
| 2013/0088439 A1* | 4/2013 | Shih | G06F 3/016 |
| | | | 345/173 |
| 2013/0155095 A1* | 6/2013 | Hussain | 345/619 |
| 2014/0006997 A1* | 1/2014 | Kim | G06F 3/0488 |
| | | | 715/773 |
| 2014/0145955 A1* | 5/2014 | Gomez | G06F 3/0317 |
| | | | 345/163 |

\* cited by examiner

1200

USER INTERACTION PLATFORM

CROSS REFERENCE TO RELATED APPLICATIONS

This application claims priority from U.S. Provisional Patent Application 61/615,206 entitled, "USER INTERACTION PLATFORM," filed Mar. 24, 2012, which is hereby incorporated by reference as if set forth in full in this application for all purposes.

BACKGROUND

Input devices such as keyboards enable a user to input data into electronic devices such as computers and notebook computers. Conventional keyboards include an arrangement of keys that enable data and commands to be input into a computer. Various arrangements of keys are available. For example, QWERTY is the most common modern-day keyboard layout. Alternative input devices, such as the mouse, stylus devices, etc. have been developed to supplement keyboard functionality. Smaller electronic devices such as tablet computers and mobile phones typically include a touchscreen, which displays a miniature version of a full-size keyboard. Each key is miniature in order to fit within the smaller size display screen. The scaling is especially small for mobile phones, which enables such phones to be small and compact.

SUMMARY

Implementations generally relate to a user interaction platform. In some implementations, a method includes providing one or more target functions to a user interaction device, where the one or more target functions enable user interaction with a primary device. The method also includes receiving user-defined configuration information for the one or more target functions. The method also includes configuring the one or more target functions based on the user-defined configuration information.

In some implementations, a computer-readable storage medium carries one or more sequences of instructions thereon. When executed by a processor, the instructions cause the processor to perform operations including providing one or more target functions to a user interaction device, where the one or more target functions enable user interaction with a primary device. The instructions when executed cause the processor to perform operations including receiving user-defined configuration information for the one or more target functions. The instructions when executed cause the processor to perform operations including configuring the one or more target functions based on the user-defined configuration information.

In some implementations, a system includes one or more processors, and includes logic encoded in one or more tangible media for execution by the one or more processors. When executed, the logic is operable to perform operations including providing one or more target functions to a user interaction device, where the one or more target functions enable user interaction with a primary device. The logic when executed is further operable to perform operations including receiving user-defined configuration information for the one or more target functions. The logic when executed is further operable to perform operations including configuring the one or more target functions based on the user-defined configuration information.

DETAILED DESCRIPTION

I. Introduction

Embodiments described herein provide a user interaction software application that improves user interaction and user experience with electronic devices such as computers, tablet computers, mobile devices, home media, etc. Such electronic devices may be referred to as primary devices. The user interaction software application, also referred to as the "user interaction application," may reside on and operate in any one or more electronic devices, which may be referred to as "user interaction devices."

The user interaction application improves a user's ability to input data into a primary device and/or to control the primary device. In various embodiments, the user interaction application provides a user with various user interaction features, which may include preconfigured and customized widgets, which include keyboard widgets, menu widgets, dock widgets as well as other tools that optimize user interaction with the primary device.

The user interaction application may receive information associated with data and commands from the primary device to facilitate the user in inputting data into the primary device and/or controlling the primary device. For example, in some embodiments, the user interaction application enables data and control information from the primary device to be displayed on a display screen associated with the user interaction application instead of or in addition to being displayed on the primary device display screen. A display screen associated with the user interaction application may be referred to as a user interaction display screen. Moving such data and control information away from the primary device display screen to the user interaction display screen minimizes congestion of visual information on the primary device display screen. For example, the user interaction application displays information associated with menus, links, software applications, etc. in a user-defined manner on the user interaction display screen.

Note that headings are used herein for readability. The various embodiments and features described herein under a single heading need not be implemented together in the same implementations under the single heading. In other words, embodiments and features described under a single heading may be implemented together in whole or in part with embodiments and features described under other headings. Various embodiments and features described under different headings may be implemented in different combinations with embodiments and features described under other headings.

A. Example Environment

Figure 1:
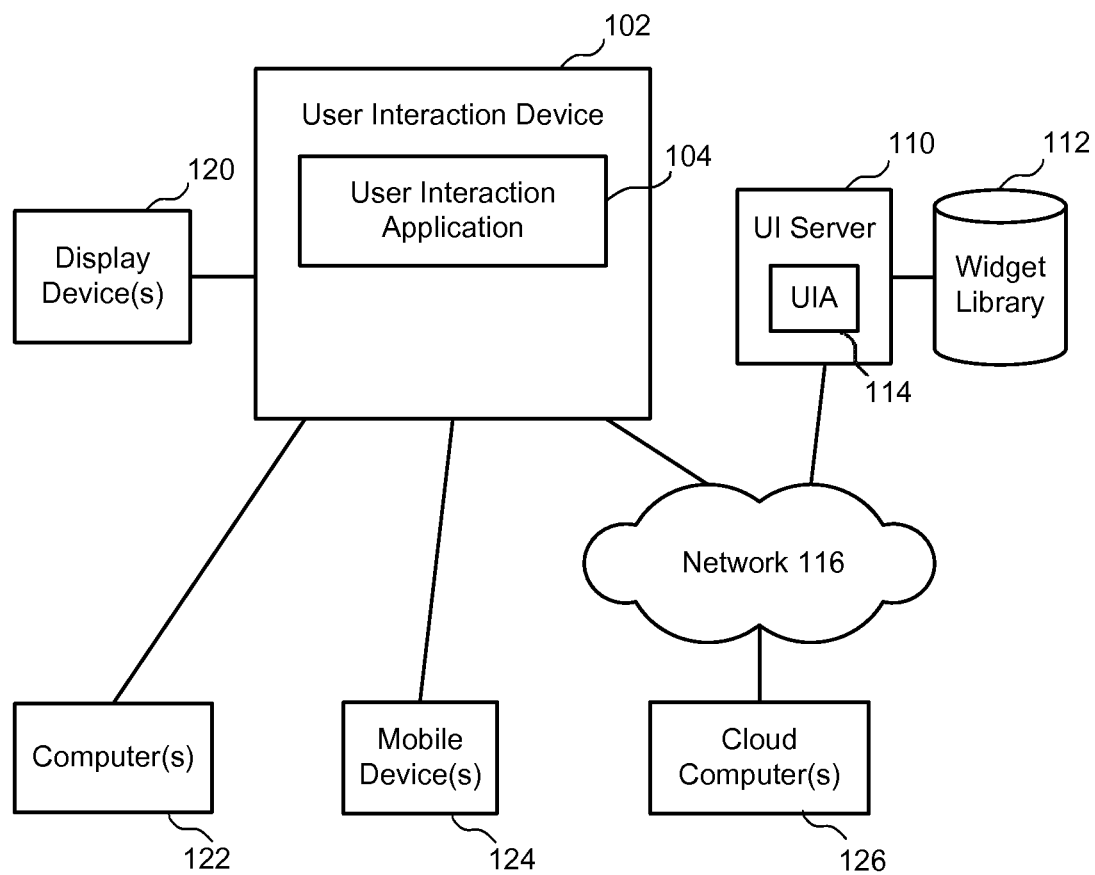
FIG. 1 illustrates a block diagram of an example environment, which may be used to implement the embodiments described herein.

FIG. 1 illustrates a block diagram of an example environment 100, which may be used to implement the embodiments described herein. As shown, environment 100 includes a user interaction device 102, which implements a user interaction application 104. In some embodiments, environment 100 also includes a user interaction server 110 (labeled "UI Server") and a widget library 112. User interaction server 110 may also implement a user interaction application 114 (labeled "UTA").

Various embodiments associated with a user interaction software platform for implementing user interaction application 104 and user interaction application 114, and various embodiments associated with a user interaction hardware platform for implementing user interaction device 102 and user interaction server 110 are described in more detail below.

In various embodiments, user interaction application 104 interacts with one or more primary devices, which may include one or more display devices 120, one or more computers 122, one or more mobile devices 124, and one or more cloud computers 126. As such, these example primary devices may also be referred to as primary devices 120, 122, 124, 126, etc.

In various embodiments, display devices 120 may include any device that has a display screen. For example, display device(s) 120 may include monitors, television screens, mobile phones, tablet computers, etc. In various embodiments described herein, user interaction application 104 and/or user interaction application 114 may provide various target functions (e.g., widget functions) to be displayed on any one or more display devices 120 in addition to or in lieu of being displayed in on a display screen of user interaction device 102.

In various embodiments, computers 122 may include any computing devices including desktop computers, laptop computers, notebook computers, etc.; and mobile devices 124 may include tablet computers, mobile phones, smartphones, etc. In various embodiments, cloud computers 126 may include any computing devices and/or servers that are accessed via network 116, or via any other network such as the Internet. The terms tablet computer and tablet are used interchangeably.

As described in more detail below, user interaction device 102 may communicate with display devices 120, computers 122, and mobile device(s) 124 via any suitable wired and/or wireless connections (e.g., Wi-Fi, Bluetooth, etc.). For example, as described in more detail below, such primary devices may include any Bluetooth enabled devices. As such, user interaction device 102 may connect and communicate with one or more primary devices via Bluetooth, or any other suitable wireless technologies and protocols (e.g., Wi-Fi, etc.). Furthermore, user interaction device 102 may communicate with cloud computers 126 using any suitable communications protocols. As described in more detail below, such communications may include sending and receiving instructions and/or data.

While user interaction device 102 is shown as being connected to user interaction server 110 via network 116, user interaction device 102 may also be connected to and communicate with user interaction server 110 directly via any suitable wired and/or wireless connections (e.g., Wi-Fi, Bluetooth, etc.).

As indicated above, in various embodiments, user interaction application 104 may reside on user interaction device 102, and user interaction application 114 may reside on user interaction server 110.

As described in more detail below, in some embodiments, widget library 112 stores various preconfigured widgets and user-configured widgets. Such preconfigured widgets and user-configured widgets may also be stored in any suitable library and/or database in a memory or on a computer-readable storage medium residing locally on user interaction device 102 and/or user interaction server 110, and/or remotely on one or more primary devices (e.g., display devices 120, computers 122, mobile devices 124, cloud computers 126, etc.), and/or any other suitable storage location(s) or computer-readable medium(s).

As described in more detail below, user interaction application 104 and/or user interaction application 114 may cause various preconfigured widgets and user-configured widgets to be sent from widget library 112 and to be downloaded to user interaction device 102 and/or user interaction server 110. Furthermore, user interaction application 104 and/or user interaction application 114 may also check for the latest widgets used by a given user, and may check for a widget that matches one or more applications with which the user is interfacing (e.g., word processing application, spreadsheet application, database application, etc.).

While some embodiments are described herein in the context of user interaction device 102 connecting with, communicating with, and controlling primary devices 120, 122, 124, 126, etc., these embodiments also apply to user interaction server 110 connecting with, communicating with, and controlling primary devices 120, 122, 124, 126, etc.

In other embodiments, network environment 100 may not have all of the components shown and/or may have other elements including other types of elements instead of, or in addition to, those shown herein.

B. Example User Interaction Computer System

Figure 2:
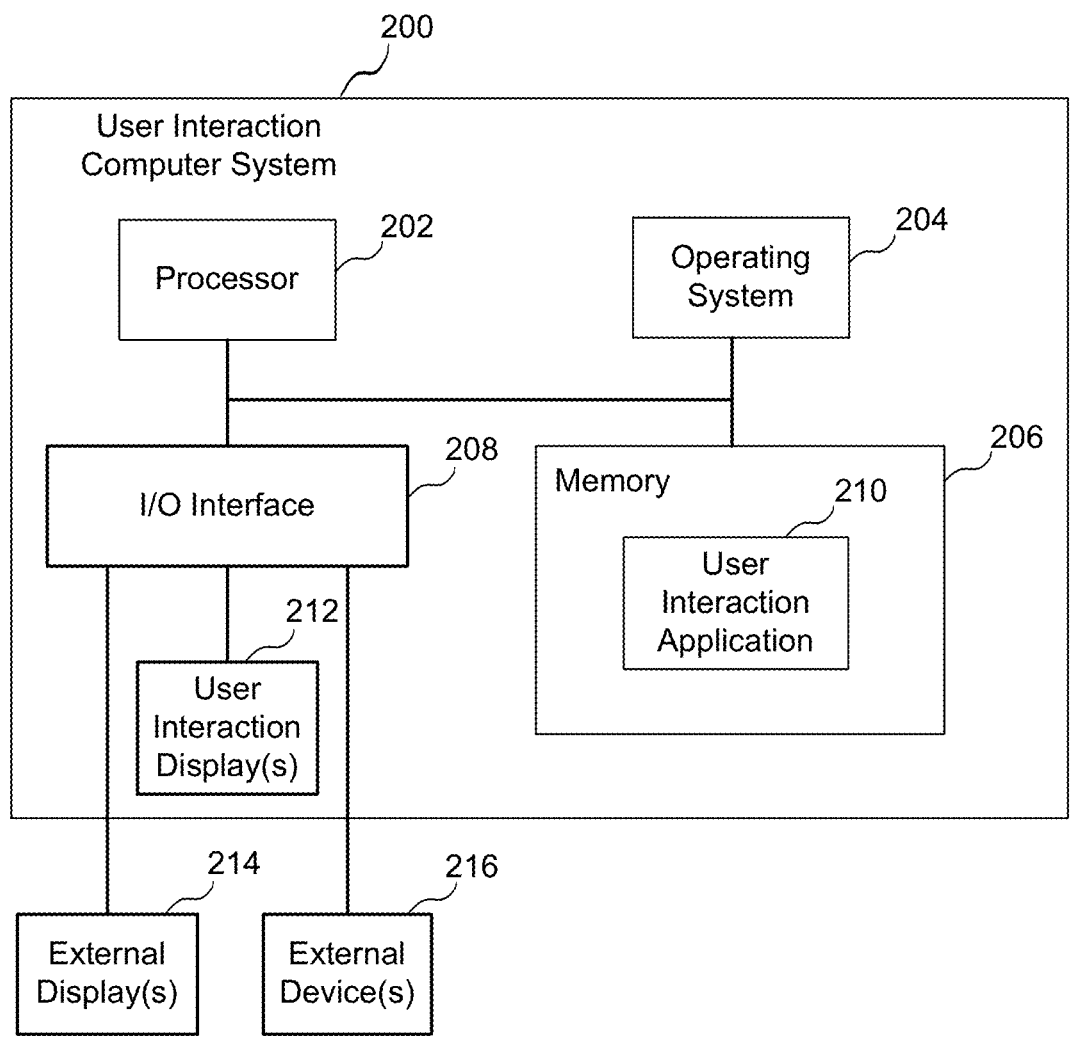
FIG. 2 is a block diagram of an example user interaction computer system, which may be used to implement the embodiments described herein.

FIG. 2 is a block diagram of an example user interaction computer system 200, which may be used to implement the embodiments described herein. For example, user interaction computer system 200 may be used to implement user interaction device 102 and/or user interaction server 110 of FIG. 1. In some embodiments, user interaction computer system 200 may include a processor 202, an operating system 204, a memory 206, an input/output (I/O) interface 208, a user interaction application 210, one or more user interaction displays or display screens 212. User interaction application 210 may be stored on memory 206 or on any other suitable storage location or computer-readable medium. User interaction application 210 provides instructions that enable processor 202 to perform the functions described herein.

In some embodiments, user interaction application 210 is stored in a memory or computer-readable storage medium, and provides instructions that enable a processor to perform these functions and other functions described herein.

In some embodiments, user interaction computer system 200 is configured to couple to one or more external displays or display screens 214 and to other external devices 216, such as primary devices 120, 122, 124, 126, etc. In various embodiments, external displays or display screens 214 may represent one or more display devices 120 of FIG. 1.

In various embodiments, user interaction computer system 200 may not have all of the components shown and/or may have other elements including other types of elements instead of, or in addition to, those shown herein.

II. User Interaction Hardware Platform

A. Overview

In various embodiments, the user interaction application enables a user interaction device to function as an input device and/or an output device. For example, in some embodiments, the user interaction application includes input functionality similar to that of a keyboard. For example, the user interaction application may have components that enable a user interaction device to function as a touchscreen keyboard. In various embodiments, the user interaction application enables a user interaction device to function as an output device. For example, the user interaction application may have components that enable a user interaction device to function as an output device similar to that of a computer monitor or connect to an external monitor to display information.

B. User Interaction Devices

1. Overview

In some embodiments, the user interaction application may be implemented with a single user interaction device. In various embodiments, the user interaction application may be implemented with multiple user interaction devices (e.g., 2, 3, 4 or more devices, etc.).

If a single user interaction device is used, the user interaction application running on the user interaction device performs all target functions desired by the user. In various embodiments, the phrase "target function" refers to a main category of widget functions such as various keyboard widget functions (e.g., providing multiple keyboards to the user), various other widget functions (e.g., providing widgets having dock functions, menu functions, etc.). As described in more detail below, various target functions are provided by various widgets, where the widgets have pre-configured and/or user-configured controls and other features that enable a user to interact with and control one or more software applications that reside on one or more primary devices. In various embodiments, the user interaction application's widget functions and functional region sizes on the user interaction device are interchangeable and user programmable in "functional regions."

In various embodiments, each user interaction device that is added enables the user to see larger portions of functional regions and widgets. The user interaction application enables the user to move widgets to any portion of the user interaction display screen(s). As such, for ease of illustration, reference to the user interaction device in the singular may refer to both the user interaction device implemented as a single device or to the user interaction device implemented with multiple devices.

If multiple user interaction devices are used, the user interaction application provides combined full functionality of widget functions across all user interaction devices seamlessly. For example, the user interaction application may dedicate one user interaction device to one or more target functions. In another example, the user interaction application may assign each target function to a different dedicated user interaction device such that the user does not need to toggle through different views to see all functions.

In various embodiments, the user interaction application may enable multiple user interaction devices to provide the user with multiple target functions (e.g., keyboard widget functions, number keypad widget functions, various other widget functions, etc.) without requiring the need for a given user interaction application to switch between two or more different target functions. For example, the user interaction application may enable a first user interaction device to function as a full keyboard unit, and a second user interaction device to function as a number keypad unit or other widget units, etc., and a third user interaction device to function as a control for home appliances, etc. As described in more detail below, through the user interaction application, a user may combine different user interaction devices for different uses. Many different user-configured variations are possible. Accordingly, in various embodiments, two or more user interaction devices may be used separately from each other or may be used together to function as a single unit.

2. Configuration of User Interaction Devices

In various embodiments, the user may use any one user interaction device for any number of target functions. The user interaction application may configure different user interaction devices identically or differently depending on the particular user or pre-configured implementations. As described in more detail below, from a software perspective, the user may configure a given user interaction device for different target functions (e.g., various widget functions, etc.) as needed. For example, the user interaction application may receive user-defined configuration information for the one or more target functions, and the user interaction application configures the one or more target functions based on the user-defined configuration information. For example, as described in more detail below, in various embodiments, the user interaction application provides target functions via various widgets. In various embodiments, each widget has user-selected and/or user-defined controls in the form of graphical user interface (GUI) elements (e.g., control icons, application icons, navigation icons, menus, etc.). A given user interaction device may serve to present various target functions to the user via such widgets. In some embodiments, the user interaction application may cause any device including primary devices to present target functions to the user. In some embodiments, as the user interaction application controls a given primary device, the user interaction application may cause the given primary device to function as a user interaction device.

In some embodiments, each user interaction device may have a port that enables the module to send and receive data and instructions from special-function devices. For example, a port may connect to an interface device for particular wired communications with an interface such as a universal serial bus (USB), FireWire, or any other suitable wired bus connection. A port may connect to an interface device for particular wireless communications such as Bluetooth, WiFi, ZigBee, infrared, etc. In some embodiments, a different user interaction device may have different integrated hardware, depending on the particular implementation. For example, in some embodiments, the user interaction application may use a hardware port and/or any other components to communicate with and control a particular primary device or primary system (e.g., an industry-specific device or system, an enterprise-specific device or system, etc.).

3. Sizes of User Interaction Devices

In various embodiments, the user interaction application may be implemented on different user interaction devices having the same or different sizes and proportions, depending on the specific implementations. For example, a given user interaction device may be configured or manufactured to be a single large device that may be sufficiently large to provide a full-size keyboard widget, for example. In some embodiments, a user interaction device may be configured or manufactured to a size that may provide a half-size keyboard widget for example. As such, user interaction application may couple two user interaction devices to make up a full-size keyboard widget, for example. In some embodiments, the user interaction application determines the number of user interaction devices used, and determines the sizes of the user interaction display screens. The user interaction application uses such determinations to allocate functional regions to the available display screens (also referred to as screen real estate) on the user interaction display screens.

4. Physical Connection Between User Interaction Devices

In some embodiments, where a user uses multiple user interaction devices together, two or more of the user interaction devices may be connected physically. As such, the user interaction application ensures that the two or more user interaction devices operate together as a single unit (e.g., effectively as a single user interaction device). In such a scenario, the user interaction application may ensure that the separate user interaction devices communicate with each other and/or with the primary device. In various embodiments, the user interaction application on one or more user interaction devices may communicate across one or more user interaction devices and/or with the primary device via wired and/or wireless communications.

In some embodiments, where a user utilizes multiple user interaction devices together, all of the user interaction devices may be disconnected physically, yet the user interaction application may ensure that physically disconnected hardware still operate together as a single user interaction device. In such a scenario, the separate user interaction applications on different user interaction devices may communicate with each other across the multiple user interaction devices and/or with the primary device wirelessly.

Functional regions such as keyboard widget regions are portions of the user interaction device display screen, and such regions are described in more detail below.

Carrying and Storage Embodiments

In some embodiments, a single user interaction device may include one or more folds that enable the device to be folded into two or more panels.

In some embodiments, one or more user interaction devices may attach to a primary device such as a tablet computer or mobile phone and function as a cover when not in use. For example, in some embodiments, a user interaction device may have a rigid backside, opposite the display screen. As such, in a carrying mode, the user interaction device may couple to the primary device such that the display screen of the user interaction device makes contact against the display screen of the primary device. As a result, the backside of the user interaction device acts as a cover and protects both its own display screen and the primary device display screen in a compact manner, convenient to the user.

5. Physical Data Entry Points a. General

In some embodiments, the user interaction device may be implemented with a computing device having a flat panel display screen or touchscreen. In some embodiments, the terms button, key, and icon, may be used interchangeably to indicate a visual object or pictogram on a display screen that a user taps in order to select a symbol, command, link, etc. Also, the terms tap, touch, and press are used interchangeably to indicate that the user makes physical contact with the display screen when selecting a button. As described in more detail below, the user interaction application may provide the user with various forms of feedback to facilitate the user when interacting with the user interaction application.

b. Visual Feedback

In some embodiments, the user interaction application may provide visual feedback to the user when the user touches a button on the display screen. For example, in some embodiments, the user interaction application changes the lighting intensity of the button (e.g., makes the button brighter) when the user touches the button. In some embodiments, the user interaction application changes the size of the button (e.g., makes the button bigger) when the user touches the button. Other visual changes to the appearance of the button are possible, including changes in color or visual pattern on or immediately surrounding the button, etc.

c. Auditory Feedback

In some embodiments, the user interaction application may enable the user interaction device to provide auditory feedback to the user when the user touches a button on the display screen. For example, in some embodiments, the user interaction application causes the user interaction device to make a sound (e.g., a click, a tone, etc.) when the user taps a button.

d. Tactile Feedback

In some embodiments, the user interaction device may include an overlay member that is coupled to the display screen of the user interaction device. In some embodiments, the overlay member is a layer that is removably coupled to the display screen. In some embodiments, the overlay member is integrated into the display screen.

In some embodiments, the user interaction application enables the user interaction device to provide tactile feedback to facilitate the user finding buttons on the display screen by feel. For example, in some embodiments, the display screen of the user interaction device may include a mechanical memory (e.g., user-moldable buttons) that enables depressed portions of the display screen to remain depressed after the user presses those regions. As such, the depressed portions provide tactile feedback to the user as to where particular buttons are located, and tactile feedback as to which buttons are in use (e.g. caps lock is on). In some embodiments, the user interaction device includes a pliable (e.g., soft or squishy) touch screen, which enables the user to feel a depression action. In some embodiments, the tactile feedback may include tactile haptic feedback (e.g., vibration).

C. Communication

1. Overview

In some embodiments, the user interaction application may connect or operatively couple multiple user interaction devices together. Similarly, the user interaction application connects or operatively couples the user interaction device (whether implemented with a single user interaction device or implemented with multiple user interaction devices) with one or more primary devices.

In various embodiments, the phrase "operatively coupled" means that the user interaction application has established communication between two or more user interaction devices, or has established communication between one or more user interaction devices and one or more primary devices. The phrase operatively coupled includes both wireless connections and wired connections. In other words, two or more user interaction devices may be physically and electronically joined by a coupling mechanism (e.g., attachment mechanism or wire); or two or more user interaction devices may be physically separate (e.g., not in physical contact) yet in communication with each other through the user interaction application. In some embodiments, the user interaction application may communicate with a cloud service associated with the user interaction application to determine which user interaction devices are located near each other. Similarly, one or more user interaction devices may be physically joined to one or more primary devices by a coupling mechanism. Alternately, one or more user interaction devices may be physically separate, yet in communication with one or more primary devices through the user interaction application. For ease of illustration, the use of the words "connected" and "coupled" includes both "operatively coupled" and "physically coupled."

In some embodiments, the user interaction device may include an interface port having a wired connection that in turn may be coupled to an add-on accessory used to communicate wirelessly (e.g., via Bluetooth, infrared, ZigBee, Wi-Fi, etc.) with other user interaction devices or directly with one or more primary devices.

In some embodiments, the user interaction device may include an electrical interface and a data and control interface that is open for third-party developers to create add-on devices and functionalities for the user interaction device. Add-on devices may include wired and wireless functionalities. For example, in some embodiments, an add-on device may be any communication device such as an infrared device that enables a given module to function as a remote control. In some embodiments, an add-on device may enable a given module to function as a remote control for one or more primary devices that is a consumer electronics device. For example, such primary devices may include TVs, stereos, CD players, DVD players, video game consoles, etc. In some embodiments, an add-on device may enable a given user interaction device to function as a remote control for a primary device that is a household or commercial system. For example, a user interaction device may function as a remote that can control a security system, heating, ventilation, or air conditioning (HVAC) systems. In such an implementation, the user interaction application may enable the user to configure the user interaction device as a remote command center.

In various embodiments, when the user interaction application on a given user interaction device communicates with another device (e.g., a primary device, another user interaction device, or any other device), the act of communicating includes communication or interaction with any one or more software programs or portions of software programs on the other device. For example, the user interaction application may communicate with any software application, software tool, middleware, firmware, operating system, etc. that resides on the other device. In various embodiments, a user interaction application may reside on one or more primary devices, which may facilitate and/or enhance a user's interaction with the primary device. The phrase software application may be used interchangeably with the phrases/terms software program application, software program, software, program, application, software code, code, software tool, tool, etc.

In some embodiments, the user interaction application may be configured to communicate securely with any other device (e.g., a primary device, another user interaction device, etc.). In some embodiments, the user interaction application may use security protocols to pass a secure token, perform a secure shell (SSH) handshake or similar. In some embodiments, if the user interaction application is running on hardware that has identity protection components, the user interaction application may leverage those components to establish secure connection with a local primary device and/or with a remote primary device (e.g., via the Internet).

2. Communication Among Multiple User Interaction Devices

As indicated above, the user interaction application enables two or more user interaction devices to function together as one single unit and/or as two or more separate units. In some embodiments, the user interaction application on multiple devices may communicate with each other in a secure manner using any suitable security encryption algorithm and/or application.

In some embodiments, the user interaction application provides the user with a seamless experience across one or more user interaction devices. For example, the user interaction application enables the user to run one or more widgets on any one user interaction device or on any combination of user interaction devices. Widgets are described in more detail below.

In some embodiments, the user may use the user interaction application to join two or more user interaction devices, and the user interaction application may display one or more widgets or other user interaction functions across two or more user interaction display screens. The user interaction application determines how the user wants to display the widgets or other user interaction functions based on how the user has physically configured the user interaction devices (e.g., two or more in a row, four in a square, etc.). Embodiments directed to user interaction are described in more detail below.

As described above, in various embodiments, the user interaction application on a given user interaction device may communicate with the user interaction software application on any other user interaction device. Such communications may be wireless (e.g., Bluetooth, Wi-Fi, infrared, or other wireless technologies, etc.) or via a wired connection (e.g., cable, cord, etc.).

In some embodiments, the user interaction application may utilize one or more wired connections to enable the two or more modules to share electrical power, data, and control information. The physical connection between each user interaction device and the wired connection may be established with any suitable coupling mechanism, as described above. In some embodiments, the wired connection may include multiple pins or any suitable electrical contact points used to transmit electrical power, data, and control information.

In some embodiments, when two or more user interaction devices are used together, the user interaction application automatically distributes functionality among the two or more user interaction devices and/or enables the user to configure how functionality is distributed among the two or more modules.

In some embodiments, when the user utilizes the user interaction application to operatively couple two or more user interaction devices together, the user interaction application detects how many user interaction devices are operatively coupled. The user interaction software application then determines which user interaction devices are coupled. If two or more user interaction devices are operatively coupled together, the user interaction application allocates the resources of the user interaction devices accordingly. In some embodiments, a cloud service associated with the user interaction application may determine user interaction devices that are physically located in a single location and make these user interaction devices available to the user interaction application. The user interaction application may detect user interaction devices by any appropriate means (e.g. via Bluetooth, etc).

In some embodiments, a user may utilize the user interaction application on multiple user interaction devices to interact with multiple primary devices. For example, a user may use the user interaction application on multiple user interaction devices to interact with a computer (e.g., using a first user interaction device), to control a TV (e.g., using a second user interaction device), to surf the Internet (e.g., using a third user interaction device), and to communicate with another user (e.g., using a forth user interaction device). Of course, the user interaction application on any one or more of these user interaction devices may perform one or more of these functions.

In some embodiments, the user interaction device functions as a viewer to a portion of an underlying visual display canvas or "canvas" that contains some or all available widgets. In some embodiments, the canvas is a layout of widgets, where each widget is positioned on the canvas relative to other widgets. In some embodiments, the user interaction application may display some or all available widgets on the canvas, and the user interaction application enables the canvas to expand to a size that is larger that the available display screen(s) associated with the user interaction application.

In some embodiments, the user interaction application loads some or all widgets, where the loaded widgets are active even though they are not all necessarily displayed at the same time on the display screen. The user may pan the canvas to view and access the loaded widgets as desired. Because these widgets are loaded, the user can quickly pan the widgets with little or no latency. In some embodiments, the user interaction application may cause the canvas to shrink or expand. In some embodiments, using user interaction application, the user may instruct the user interaction application to shrink or expand the canvas.

In some embodiments, if not all widgets are currently loaded, the user interaction application may load additional widgets to be added to the canvas based on one or more predetermined policies. For example, the user interaction application may load additional widgets associated with a position on the canvas close to an area of the canvas toward which the user is panning. In other words, the user interaction application may preload widgets that have a high likelihood of being available to the user. In another example, the user interaction application may load additional widgets that may have a predetermined relationship and/or complimentary functions as currently used widgets. For example, if the user tends to use two or more widgets within a particular time period, the user interaction application learns these usage patterns and loads a group of widgets together. This embodiment is beneficial if, for example, the user has a group of widgets regularly used for work-related or personal tasks. In other words, the user interaction application anticipates usage patterns of widgets, based on historical usage in order to preload such widgets for immediate use to the user. In some embodiments, the user interaction application may launch widgets based on one or more applications launched on the primary device. For example, in some embodiments, if the user launches a browser, the user interaction device may launch widgets that are associated with the browser or that the user tends to access and use when using the browser. In some embodiments, the user interaction application may suggest widgets based on such usage patterns or based on particular launched applications.

3. Communication with One or More Primary Devices a. General

As indicated above, one or more user interaction devices may be coupled with one or more primary devices. In various embodiments, one or more primary devices may be located locally or in the cloud (e.g., over the Internet). The user interaction application on each of the one or more user interaction devices may communicate with the one or more primary devices wirelessly (e.g., via Bluetooth, Wi-Fi, infrared, or other wireless technologies, etc.) and/or via one or more wired connections (e.g., cables, cords, etc.).

In some embodiments, the physical connection between each user interaction device may be established via the same coupling mechanism (e.g., cable, cord, etc.). In some embodiments, the wired connection may include multiple contacts. The contacts may be used to transmit electrical power, data, and control information.

While some embodiments are described herein in the context of one primary device, such embodiments also apply to multiple primary devices. For example, in some embodiments, a module that performs widget functions may include widgets that enable a user to interact with a computer primary device as well as with a television primary device, etc.

b. Multiple User Interaction Devices to One or More Primary Devices

In some embodiments, when multiple user interaction devices are used together, the user interaction application of each user interaction device communicates directly with the primary device. In some embodiments, a user interaction application may reside on the primary device to facilitate communication between the primary device and multiple user interaction devices. In such a scenario, the user interaction application on the primary device receives information from the different user interaction devices. The information may include data and control information.

In some embodiments, the user interaction application on the primary device processes and aggregates the information and performs associated functions accordingly. A benefit to this configuration is that the user interaction application on the primary device uses resources of the primary device, instead of using the resources of the user interaction devices. Because the primary device (e.g., local or cloud computer) performs the majority of processing, the user interaction software application on the user interaction device performs minimal processing. In some embodiments, the user interaction application may reside on one or more servers over the Internet/in the cloud, where the user interaction application may facilitate the user interaction application on the primary device in communicating with one or more user interaction devices. In such a scenario, the user interaction application in the cloud receives information from the different user interaction devices. The information may include data and control information. The user interaction application on the primary device then processes and aggregates the information and performs associated functions accordingly.

For ease of illustration, these example embodiments are described in the context of a single primary device. These embodiments and the other embodiments described herein also apply to multiple primary devices.

c. Single User Interaction Device to One or More Primary Devices

In some implementations, where multiple user interaction devices are used together, the user interaction application of one of the user interaction devices communicates directly with the primary device. This scenario is beneficial where the primary device has limited resources or limited processing power. In some embodiments, when multiple user interaction devices are used together, the user interaction application enables the user interaction devices to communicate directly with each other, and enables the user interaction application of one of the user interaction devices to communicate directly with the primary device. In some embodiments, the user interaction application of the user interaction device that is operatively coupled to the primary device may determine how functionality is distributed among the user interaction devices.

In some embodiments, if two or more user interaction devices are used together, their respective user interaction applications may negotiate with the user interaction application performing a management role based on one or more predetermined policies. For example, in some embodiments, the particular user interaction application that performs the management role may be selected randomly. In some embodiments, the user interaction application that performs the management role may be selected based on a target function of the user interaction device (e.g., left keyboard widget functions, right keyboard widget functions, or any other widget functions, etc.). In some embodiments, the user interaction application that performs the management role may be the first one to communicate directly with the primary device. In some embodiments, if a user interaction application on a first device has already established communication with the primary device, that particular user interaction application maintains communication with the primary device. The user interaction application on any subsequently added user interaction device(s) sends and receives information to and from the primary device via the user interaction application on the first device.

In some embodiments, the management role may dynamically move from one user interaction application to another based on a policy. For example, in some embodiments, if the current user interaction application performing the management role becomes inactive, another user interaction application may automatically take on the managing role. A user interaction application may become inactive for various reasons (e.g., power loss, being turned off, damage, etc.). In some embodiments, the user interaction application may transfer the management role to another user interaction application if the current user interaction application currently performing the management role changes activity above or below a predetermined level of activity. For example, another user interaction application may automatically take on the managing role if the current managing user interaction application becomes sufficiently busy (e.g., high load) so as to cause a predetermined amount of latency when communicating with other user interaction applications.

In some embodiments, a remote user interaction application in the cloud may perform the managing role for user interaction applications on a cluster of local user interaction devices. In some embodiments, the user interaction application in the cloud may manage and control a canvas of widgets and determine how multiple user interaction devices display the widgets.

In such a scenario, one or more of the user interaction applications of the different user interaction devices may display a selection menu to the user. The user may then select the user interaction application to perform the management role. Depending on which user interaction application the user uses to make the selection (e.g., by tapping on the appropriate menu selection, etc.), that user interaction application receives the selection and then transmits the selection to the rest of the user interaction applications on the other user interaction devices.

In some embodiments, the user interaction application that is selected (either by the user or other policy) assumes the management role. This user interaction application may be referred to as the "managing user interaction application." As described above, the managing role may be transferred from one user interaction application to another based on one or more predetermined policies. In various embodiments, the managing user interaction application activates software components dedicated to the management role. In various embodiments, while the managing user interaction application functions to distribute functionality between two or more user interaction devices, the managing user interaction application is not limited to such managing functions. The managing user interaction application may cause its user interaction device to perform any one or more target functions (e.g., keyboard functions, left-hand keyboard functions, right-hand keyboard functions, widget functions, etc.) The rest of the user interaction applications temporarily deactivate appropriate software components dedicated to the management role. Each user interaction application may of course continue to operate appropriate software components that facilitate the managing user interaction application in performing the management role. These user interaction applications may be referred to as non-managing user interaction applications. Non-management user interaction applications may perform any one or more target functions. Any one of the non-managing user interaction applications may reactivate its software components dedicated to the management role as needed (e.g., if later selected by the user or based on a policy).

In some embodiments, if a user interaction device is added to an existing group of user interaction devices that are already operatively coupled together, the managing user interaction application remains the managing user interaction application, and the user interaction application of the newly added user interaction device functions as a non-managing user interaction application, and performs other target functions.

In some embodiments, the user interaction application on multiple user interaction devices may take on the management role collaboratively. In such a case, depending on primary device(s) connected or widgets being run on user interaction devices, the user interaction application may determine that certain management decisions will be distributed among user interaction applications on different interaction devices. In such scenario, depending on the task being performed, the management role and decision making process may shift from user interaction application to another.

In various embodiments, the primary device may be any computer system such as a computer server, a personal desktop computer (e.g., PC, Mac, etc.), a laptop computer, a notebook computer, etc. The primary device may also be a tablet computer, a mobile phone, or a smartphone, wearable device, etc. The primary device may also be any mobile operating system device, which may or may not include middleware and particular applications (e.g. applications for an iOS device, Android device, etc.). The primary device may also be any appliance such as a household appliance or a commercial appliance or industry equipment, etc.

The primary device may also be a media device such as a television or any other consumer electronic device or system. The primary device may also be a computer system that is remote from the user interaction device. For example, the primary device may be a remote computer server that is accessed via a network such as the Internet through an intermediary primary device.

In some embodiments, the user interaction application may implement a keyboard widget or a computer mouse widget both of which may be used to substitute for a traditional keyboard and computer mouse. In some embodiments, the user interaction application may implement a keyboard widget and mouse widget in combination with a traditional keyboard and computer mouse. In some embodiments, the user interaction application of a given user interaction device automatically detects when it is operating in conjunction with a traditional keyboard or computer mouse, or with any other input or interface devices.

III. User Interaction Software Platform

A. Overview

In various embodiments, the user interaction software platform enables a user interaction device to function as a broker device or intermediary device between the user and one or more primary devices (e.g., computers, tables, mobile phones, etc.) and display screens. The user interaction software platform improves and enhances user interaction with one or more primary devices by providing a user with a selection of customizable widgets, which include keyboard widgets, dock widgets, menu widgets, etc. The user interaction software platform frees up screen real estate on the display screen of a given primary device by moving the graphical user interface (GUI) elements (e.g., control icons, application icons, navigation icons, menus, etc.) from the display screen of the primary device to the customizable widgets of the user interaction device. Even if some GUI elements remain on the primary device display screen, such GUI elements need not be expanded on the primary device display screen (e.g., to show hidden layers of menu options, controls, etc.). Moving such GUI elements to the user interaction device enables the user to access and control such GUI elements on the user interaction device using the user-customizable widgets.

In some embodiments, the user interaction application enables users to interact, control and operate applications running on primary devices, such as but not limited to personal computers, home or commercial appliances, tablet computers or mobile devices. A primary device may be local or remote (e.g., in the cloud), which could be running on Windows, Apple, Unix, Linux, mobile (such as iOS, Android, Symbian, etc.) or any other operating system.

In various embodiments, the user interaction software platform includes the user interaction application and associated middleware, drivers, embedded software, firmware, etc. Note that the phrase software application may be used interchangeably with the phrases/terms software program application, software program, software, program, application, software code, code, software tool, tool, etc.

As described above, in various embodiments, the user interaction application may reside on one or more devices, referred to as user interaction devices. In some embodiments, user interaction applications may reside on any suitable devices. Suitable devices that the user interaction application may reside on may include devices that have a touch screen (such as a touch screen display, tablet, etc.), recognize gestures, voice, components that read lips, components that track eye movements, etc. In various embodiments, the user interaction application operates according to the operating system configuration and the user interaction device hardware that the user interaction application is running on.

In the embodiments described herein, the phrase "user interaction device" refers to an electronic device that implements the user interaction application. A user interaction device is distinguished from a primary device in that the user interaction application of the user interaction device functions as a broker device or intermediary device between the user and the primary device. In some embodiments, the user interaction application functions as a broker device or intermediary device between the user, the primary device, and a display screen. Even though a user interaction application may reside at least in part on a primary device, such a user interaction application functions to facilitate the user interaction application residing on one or more user interaction devices.

In some embodiments, the primary device may be a remote primary device. While some embodiments described herein are described in the context of one primary device, for ease of illustration, embodiments described here also apply to multiple primary devices. For example, in some embodiments, the user interaction device may transmit data and control information to one or more remote primary devices (e.g., a remote cluster of servers in the cloud). Interaction with applications on the one or more primary devices may cause the one or more primary devices to process the data. In some embodiments, the user interaction application enables a local user interaction device to function as a workstation for a cloud system. In various embodiments, the user interaction application may be adapted and customized to interact with and control one or more applications on one or more primary devices.

In some embodiments, if a remote computer system in the cloud is used, the user interaction application simply needs access to a network access point. The user interaction application enables the user interaction device to function as a workstation relative to the computer system in the cloud. In various embodiments, the user interaction application may cause any suitable display screen to display information to the user. For example, the user interaction application may cause the display screen on the user interaction device or a local monitor to display information to the user.

In some embodiments, the user interaction application may communicate with one or more remote primary devices via a network access point. In some embodiments, the user interaction application may display relevant data and control information in widgets, where the user interaction application causes the widgets to be displayed on a display screen associated with the user interaction application. The display screen may be integrated into the user interaction device and/or may be separate from the user interaction device. For example, the display screen may be a computer monitor, television, tablet display screen, mobile phone display screen, or display screen of any other user interaction device.

In various embodiments described herein, the user interaction application eliminates the need for a conventional keyboard and mouse. Furthermore, in various implementations such as cloud system applications, the user interaction application eliminates the need for a conventional computer, tablet, or mobile phone for various forms of communication and data processing. As such, in various embodiments, the user interaction application enables a user interaction device to function as a thin client.

1. Input and Output Functionality

In various embodiments, the user interaction application enables an otherwise dumb user interaction device to function as a flexible, intelligent input device. For example, the user interaction application may receive input from the user, process the input, and then transmit the input to the primary device. For ease of illustration, examples are described in the context of one primary device. In various embodiments, the same examples may be applied to multiple primary devices.

In various embodiments, the user interaction application also enables an otherwise dumb user interaction device to function as a flexible, intelligent output device. For example, the user interaction application may communicate with the primary device, which in turn facilitates the user interaction application to provide feedback to the user. For example, the user interaction device may receive various types of information from the primary device (e.g., available applications in a dock, GUI elements, content from a website, etc.). In various embodiments, the user interaction application displays, on the interaction device, GUI elements including control information, navigation information, content, etc., which enables the user to efficiently interact with the primary device.

In some embodiments, the user interaction application displays such information in the user interaction display screen. In some embodiments, the user interaction device may also display the information on an external display screen (e.g., a computer monitor, any display screen associated with the primary device, etc.) in order to provide various viewing options for the user.

In some embodiments, a user interaction application may be installed on the primary device (or at least a portion of the user interaction application, client version of the user interaction application, plug-in, etc.) to facilitate in processing information and displaying the processed information between the user interaction application on user interaction device and the primary device. For example, if the primary device launches a word processor application (e.g., Word), the user interaction application detects the launched word processor application and displays corresponding information to the user via an appropriate display screen (e.g., the display screen of the user interaction device).

2. Customization

In some embodiments, the user interaction application may enable a user interaction device to operate with a local primary device (e.g., personal desktop computer, laptop/notebook computer, tablet, mobile/smart phone, etc.) or to operate with a remote primary device (e.g., server or computer via the Internet/cloud).

As described in more detail below, the user may utilize the user interaction application to customize an existing widget or to create and define a widget from scratch. Also, a user-customized widget may be saved and downloaded/incorporated into the user interaction application.

Third-party application developers may also utilize the user interaction application to create widgets or configurations for third-party applications. The user interaction application may run on any operating system (e.g., Windows OS, Apple Mac OS, Apple iOS, Unix/Linux OS, mobile platform OSs, etc.) of a user interaction device or any available electronic device, or run on any operating system on a remote server or computer via the Internet/cloud.

In some embodiments, the user interaction application enables the user to set preferred configurations for particular applications or websites that the user is interacting with. In some embodiments, the user interaction application loads the appropriate configuration when the user launches a particular application or website. For example, when the user launches or is using an email application, the user interaction application may display email related widgets.

B. User Interaction Layout—Widget Regions

Figure 3:
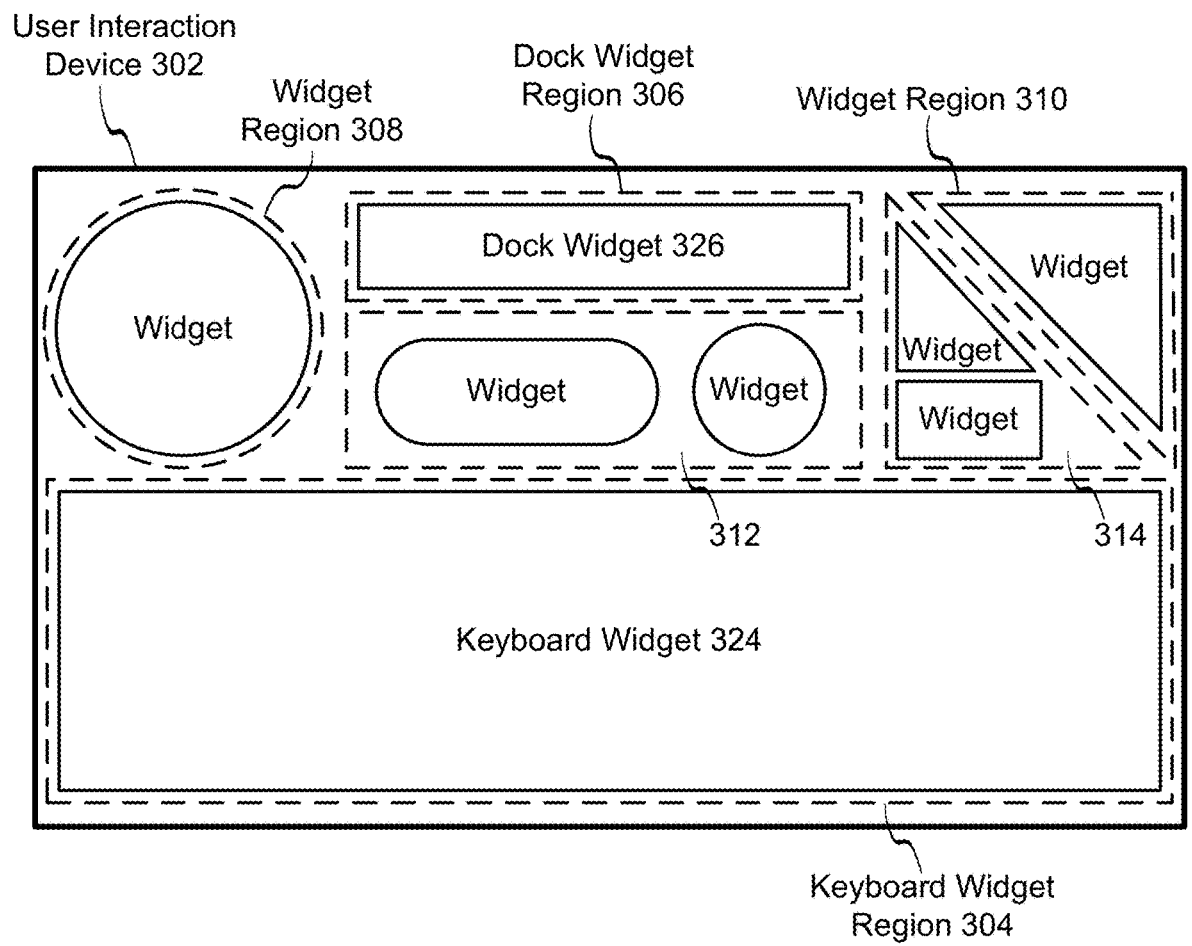
FIG. 3 illustrates a simplified example graphical user interface (GUI) that includes functional regions, according to some embodiments.

FIG. 3 illustrates a simplified example graphical user interface (GUI) 300 that includes functional regions, according to some embodiments. In the example embodiment shown in FIG. 3, GUI 300 is displayed on a single user interaction device 302. As shown, the user interaction application causes various functional regions, which include widget regions and provide various types of widgets, to be displayed in GUI 300. GUI 300 shown in FIG. 3 includes examples of particular types of regions. For example, GUI 300 includes a keyboard widget region 304, a dock widget region 306, as well as other widget regions 308, 310, 312, and 314.

As shown, the user interaction application causes a keyboard widget 324 to be displayed in keyboard widget region 304. The user interaction application also causes a dock widget 326 to be displayed in dock widget region 306. Similarly, the user interaction application also causes widgets of various shapes and sizes to be displayed in respective widget regions 308, 310, 312, and 314. Various example embodiments of widgets are described in more detail below.

In some embodiments, the user interaction application displays features of different target functions within different corresponding functional regions. In various embodiments, each functional region may be dedicated to one or more groups of particular target functions (e.g., keyboard widget functions), and each functional region facilitates user interaction with one or more primary devices. As described above, the user interaction application may display some or all available widgets on a canvas that may expand to a size larger that the available display screen(s) associated with the user interaction application. In some embodiments, the user interaction application may enable the canvas to shrink or expand, depending on the number and size of the widgets relative to the size of the display screen(s) associated with the user interaction application. In some embodiments, the user may manually shrink or expand the canvas using the user interaction application's controls.

In some embodiments, the size of the regions may be static, fluid, or dynamic, depending on the particular implementation and/or depending on the size of the viewing area or display screen. In some embodiments, the user interaction application may adjust a given region of a widget dynamically. For example, as the user pinches or stretches an area or region, the regions surrounding that area or region dynamically adjust. In another example, the user interaction application may enable a user to group widgets in a particular region, and when the user adds another widget to the group, the region dynamically adjusts to accommodate the newly added widget. In some embodiments, regions can be moved or interchanged with each other. For example, a left side keyboard widget region and a right side mouse widget region can be interchanged so that the left region becomes the mouse widget region and the right region becomes the keyboard widget region. In some embodiments, particular regions may remain static while other regions are dynamic. For example, a keyboard region may remain the same size so that the user may continue typing on a keyboard that doesn't change sizes, while other regions have sizes that change dynamically. In some embodiments, the user interaction application may enable the user to lock one or more regions so that they remain the same size and to make sure that the region(s) that are locked are not accidentally moved.

The phrase "target function" refers to a main category of functions such as keyboard widget functions (e.g., providing multiple keyboards with different configurations, languages, etc. to the user), dock widget functions (e.g., providing multiple docks to the user), etc. As such, a given user interaction device may provide one or more target functions for a user.

For ease of illustration, the particular name of a given functional region may correspond to its target function. For example, a functional region associated with keyboard widgets may be referred to as a keyboard widget region. Various functional regions are described in detail below.

1. Widget Regions Generally

In general, the widget region is a functional region that may be dedicated to widget functions, depending on the particular implementation. In some embodiments, the widget region may display one or more user-selectable widgets, which the user may select to enhance user interaction with one or more primary devices. The user interaction application enables the user to define (e.g., defining a new widget region), move, re-size or interchange widget regions. The user-selectable widgets may include preconfigured widgets and user-configured widgets. User-configured widgets may also be referred to as user-customizable widgets. A user-configured widget may be a pre-configured widget that the user has modified or a new widget that the user has created. Embodiments associated with the widget region are described in more detail below. The following are examples of various types of widget regions.

In some embodiments, a dedicated widget region may be predefined for preconfigured and/or user-configured widgets, which are described in more detail below. Various examples of different types of widget regions are described below.

2. Viewer Widget Region

In some embodiments, a viewer region is a functional region that may be dedicated to viewer widgets and associated functions that provide an overview of different functional regions. For example, in some embodiments, the viewer widget region may display a site map or single page map showing different functional regions. In some embodiments, the viewer widget region may include a variety of indicators. For example, one indicator may show which functional regions are active. Another indicator may be a pointer that enables the user to navigate to different functional regions. For example, the user may use the pointer to select a functional region that is visible in the viewer region but might be hidden elsewhere on the display screen. Embodiments associated with the viewer widget region are described in more detail below.

3. Keyboard Widget Region

In some embodiments, a keyboard widget region is a functional region that may be dedicated to keyboard widgets and associated keyboard functions. In some embodiments, the keyboard widget region may display one or more user-selectable keyboards, which the user may select to enhance user interaction with one or more primary devices. The user-selectable keyboards may include preconfigured keyboards and user-configured keyboards. The phrase keyboard widget and the term keyboard are use interchangeably. User-configured keyboards may also be referred to as user-customizable keyboards. A user-configured keyboard may be a pre-configured keyboard that the user has modified or a new keyboard that the user has created. Embodiments associated with the keyboard region are described in more detail below.

4. Dock Widget Region

In some embodiments, a dock widget region is a functional region that may be dedicated to dock widgets and associated dock functions. In some embodiments, the dock widget region may display one or more user-selectable docks, which the user may select to enhance user interaction with one or more primary devices. The user-selectable docks may include preconfigured docks and user-configured docks. The phrase dock widget and the term dock are use interchangeably. User-configured docks may also be referred to as user-customizable docks. A user-configured dock may be a pre-configured dock that the user has modified or a new dock that the user has created. Embodiments associated with the dock region are described in more detail below.

5. Independence of Widget Regions

In various embodiments, the different functional regions are separate and independent from each other. The functional regions may all be displayed adjacent to each other in a GUI of one user interaction device, or the user may toggle through different functional regions in the GUI of the same user interaction device. In various embodiments, the user interaction application enables the user to position functional regions in any location on one or more user interaction devices. The user may position functional regions contiguous to each other, overlapping each other, etc. In various embodiments, the user interaction application enables the user to adjust each region separately and independently (e.g., pan, tilt, zoom, rotate, etc.).

For example, in some embodiments, the user interaction application provides the user with zooming capabilities for viewing the entire display screen (all functional regions). In some embodiments, the user interaction application provides the user with zooming capabilities for each functional region individually on the display screen. For example, this enables the user to enlarge a widget in a widget region while maintaining the size of keys on a keyboard in the keyboard widget region.

In some embodiments, if particular objects in a given functional region are enlarged significantly, the user interaction application ensures that the objects do not spill over into other functional regions. For example, in some embodiments, the user interaction application may limit the size of particular objects (e.g., a keyboard) to the functional region boundaries such that the particular objects may enlarge but enlarge up to a predetermined limit such that the objects do not enlarge enough to encroach into other functional regions. Alternatively, the user interaction application may allow particular objects to get cropped such that the particular objects enlarge but do get cropped at the functional region boundary so as to not encroach into other functional regions. In such an implementation, the user can pan within in the functional region to display hidden or partially hidden objects.

In various embodiments, the user interaction application enables the user to pinch the touch screen (or use other methods) to zoom in or zoom out in any given functional region. In some embodiments, the user interaction application enables the user to tap or grab and drag a portion (e.g., any one or more corners) of an object such as a keyboard or widget to re-size the object. The resizing may shrink or expand an object or bring the object to a default size or to the previous size. In some embodiments, the user interaction application enables the user to pan an object. In some embodiments, these objects may be arranged on a canvas, as described above, where the user interaction application enables the user to zoom in or zoom out and/or pan the canvas to view and access the objects on the canvas.

In some embodiments, the user interaction application enables the user to bring a partially hidden functional region into view by pointing or pressing and holding outer-bounds of the functional region to activate it and then swipe inward to bring it into view.

a. Display of Functional Regions Across One or More User Interaction Devices

Figure 4:
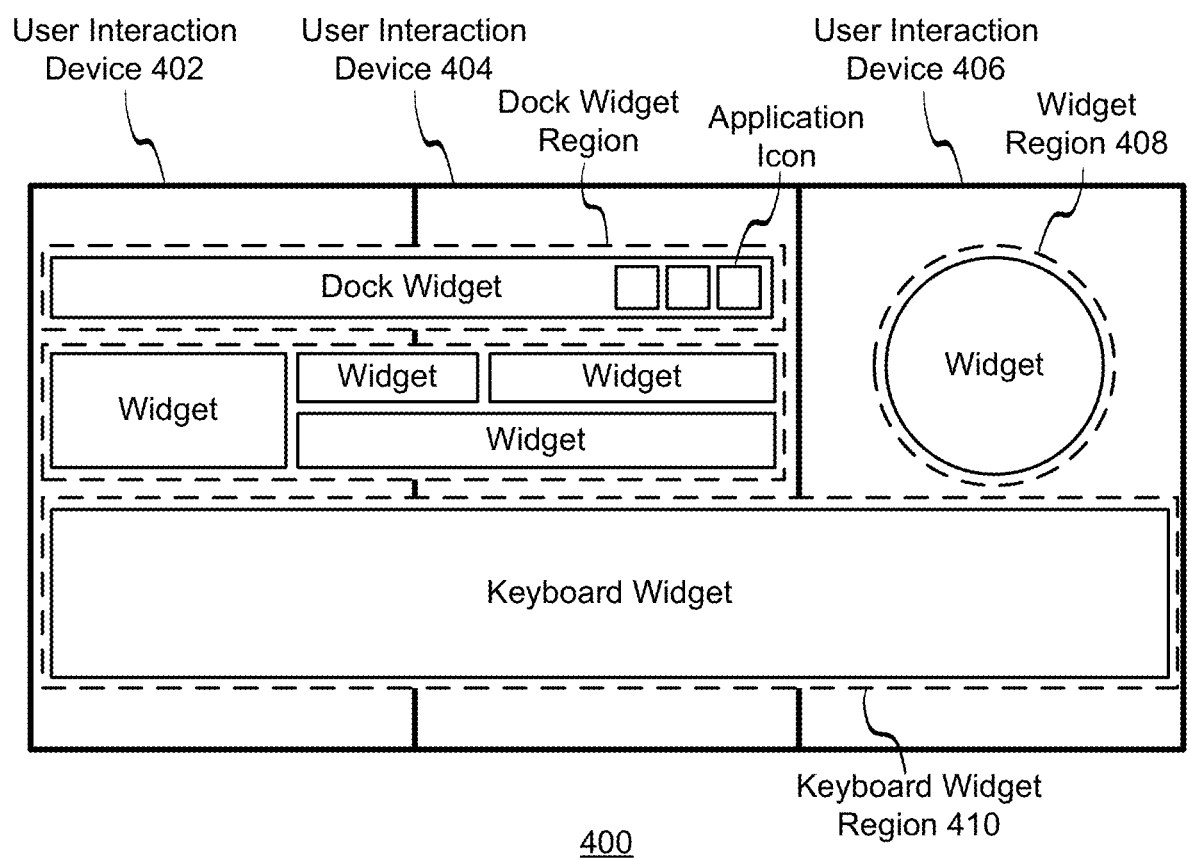
FIG. 4 illustrates a simplified example GUI that includes functional regions, according to some embodiments.

FIG. 4 illustrates a simplified example GUI 400 that includes functional regions, according to some embodiments. In the example embodiment shown in FIG. 4, GUI 400 is displayed across multiple user interaction devices 402, 404, and 406. As shown, in various embodiments, a given functional region (e.g., widget region 408) may be displayed entirely on one user interaction device (e.g., user interaction device 406). In various embodiments, a given functional region (e.g., keyboard widget region 410) may be spread across multiple user interaction devices (e.g., user interaction devices 402, 404, and 406).

In some embodiments, a given user interaction device may be dedicated to any one target function and thus would display one functional region. For example, a user interaction application of user interaction device 406 may cause widget region 408 to be displayed on the display screen of user interaction device 406. In another example, a user interaction application of a given interaction device may display only a keyboard region. In some embodiments, the user interaction application that displays only a keyboard region may provide a selection of keyboards, and may implement a keyboard that the user selects.

In other embodiments, a given user interaction device may be dedicated to two or more target functions, depending on the desire of the user, and would display two or more corresponding functional regions. For example, a given user interaction device may display an entire keyboard region, an entire widget region, and an entire dock region. These are example embodiments where a single user interaction device is used.

The following embodiments include implementations where multiple user interaction devices are used together as a single unit. In some embodiments, a user interaction application may cause a given functional region (e.g., a keyboard widget region 410) to be displayed such that it is spread across two or more user interaction devices (e.g., user interaction devices 402, 404, and 406). FIG. 4 shows various other configurations of functional regions and corresponding widgets within the functional regions.

In some embodiments, a user interaction application may provide widgets or portions of widgets that are displayed on the corresponding user interaction device on which the given user interaction application resides. For example, assume that a keyboard widget is displayed across the display screens of two user interaction devices, such that a left portion of the keyboard widget is displayed on the user interaction device on the left, and a right portion of the keyboard widget is displayed on the user interaction device on the right. The user interaction application of the user interaction device on the left may provide the functionality for and displays the left portion of the keyboard widget. The user interaction application of the user interaction device on the right may provide the functionality for and displays the right portion of the keyboard widget.

In such a scenario, the user interaction application on one of the user interaction devices may still function as a managing user interaction application in that the managing user interaction application aggregates information to be sent to the primary devices. The managing user interaction application also receives information from the primary device and distributes the information accordingly.

In some embodiments, the managing user interaction application may distribute the functionality of a functional region among the two or more user interaction devices. For example, in a similar scenario to that described above, assume that the functional region is a keyboard region and is spread across two user interaction devices. The managing user interaction application may cause one user interaction application (e.g., on the user interaction device on the left) to display a left portion of a keyboard widget and cause the other user interaction application (e.g., on the user interaction device on the right) to display a right portion of the keyboard widget. In other words, instructions related to the distribution of functionality are provided by the managing user interaction application. While a keyboard widget region is described in these examples, embodiments described herein also apply to other functional regions (e.g., dock widget regions, etc.)

In some embodiments, as indicated above, functional regions operate individually and separately from each other. Accordingly, in some embodiments, where multiple user interaction devices are used together as a single unit, the user interaction application enables a first functional region (e.g., keyboard widget region) to remain entirely on one user interaction device and a second functional region (e.g., mouse widget region or dock widget region) to be spread across two or more user interaction devices, and vice versa. In some embodiments, both of the above described first and second functional regions may be spread across two or more user interaction devices.

In various embodiments, different functional regions may be simultaneously spread across different numbers of user interaction devices, where all these user interaction devices are coupled together and used as a single unit. For example, the user interaction application may display a keyboard widget region on one of the user interaction devices, display a dock widget region across two user interaction devices, and/or display a mouse widget region over three user interaction devices. Different configurations are possible. In some embodiments, the user interaction applications on respective user interaction devices may display a first widget on a first user interaction device, a second widget on a second user interaction device, and a third widget across the second and third user interaction devices.

Note that while particular functional regions are described (e.g., keyboard widget region, dock widget region, etc.), these are only example functional regions with corresponding target functions (e.g., keyboard functions, widgets functions, docks functions, etc.) and corresponding user interface objects (e.g., keyboards, widgets, docks, etc.). Embodiments described herein also apply to other functional regions. For example, embodiments may provide a mouse region, auto-suggest region, icon region, etc., and associated target functions and user interface objects.

As described herein, the user interaction application enables the user to spatially configure or arrange functional regions on a single user interaction device or across multiple user interaction devices. In various embodiments, the user interaction application enables the user to spatially configure or arrange functional regions in a variety of ways relative to each other. For example, in some embodiments, functional regions may be fixed such that they do not overlap. Functional regions may be moved around and re-arranged by the user, similar to the manner in which windows are moved (e.g., dragging). One or more functional regions may overlap. In some embodiments, if any two or more functional regions overlap, the user interaction application may render one or more top layers partially transparent in order for the bottom layers to be visible. If more than two layers overlap, the user interaction application may render the top layers partially transparent with different degrees of opaqueness such that the uppermost layer has the least amount of opaqueness. In some embodiments, the user interaction application enables the user to tap on any overlapped widget to bring it to the front of a stack of widgets or enables the user to send widgets to the back of the stack.

In some embodiments, the user interaction application may render functional regions in a variety of shapes, including but not limited to squares, rectangles, circles, ovals, as well as other shapes. Such shapes may be predetermined default shapes. For example, a keyboard region may have a rectangular shape. In some embodiments, the user interaction application enables the user to configure any one or more functional regions into any predetermined default shape or into any user-defined shape as part of a custom configuration.

In some embodiments, the user interaction application enables users and application developers to create customized widgets for their applications using a desktop application or an online service associated with the user interaction platform. In some embodiments, when a user launches a particular application (e.g., a word processor application, etc.) on the primary device, the user interaction application detects if any widgets (e.g., preconfigured or user-configured/customized widgets) are available for the particular application, and will present an option to the user to activate and display the available widget. The available widget may be fetched from a local storage unit and/or database of widgets (e.g., stored on the user interaction device) or from a remote database (e.g., stored on a server over the Internet/in the cloud).

In some embodiments, the user interaction application contains some pre-configured widgets, described in the following sections. The user may use these preconfigured widgets out of the box, or the user may modify/customize these widgets. The user may also modify and/or create widgets from scratch using a desktop application, or an online service associated with the user interaction platform. The user can download preconfigured and/or user-configured widgets from a personal computer and/or from an online website or server (e.g., using a browser plug-in or any suitable software tool, etc.).

Descriptions above described widget regions that may define areas on a display screen of a user interaction device, where widgets may be displayed in and/or associated with one or more of these regions. The follow sections describe example embodiments of widgets in more detail.

C. Widgets Generally

In some embodiments, the user interaction application provides preconfigured widgets and user-configured/customized widgets to the user. In various embodiments, widgets provide the various target functions described herein by enabling the user to manipulate information in order to communication with and/or control one or more primary devices. The widgets enable the user to effectively and efficiently interact with software applications running on one or more primary devices. In various embodiments, the user interaction application provides widgets to the user to enable the user to view and manipulate data and control information at one or more user interaction devices. In various embodiments, the widgets enable the user to exchange date and control information with applications running on the one or more primary devices. Widgets enable the user to utilize the controls and other features and functions on the widgets, in lieu of or addition to controls provided by applications running on the one or more primary devices.

In various embodiments, the user interaction application may cause one or more display screens associated with the user interaction application to display a selection of widget choices, as well as associated controls for selecting types of widgets (e.g., keyboard widget selection, etc.), toggling through multiple choices, and selecting one or more particular widgets. In some embodiments, the user interaction application may position a given widget in a particular region. In some embodiments, the selection may include a series of thumbnails or miniature versions of widgets, and/or even full size versions of widget options, depending on a view setting that the user interaction application enables the user to select.

1. Preconfigured Widgets

In some embodiments, the user interaction application provides preconfigured widgets to the user. Such preconfigured widgets may include user interface (UI) objects (e.g., buttons, icons, images, etc.) for particular standard functionalities such as a calendar, timer, calculator, number pad, mouse pad, etc. Preconfigured widgets may also include UI objects for particular applications (e.g., word processor applications, spreadsheet applications, presentation applications, drawing applications, game applications, etc.). Preconfigured widgets may also include UI objects for particular websites (e.g., email websites, social networking websites, etc.). Preconfigured widgets may also include UI objects for browser control (e.g. bookmark, refresh, back & forward buttons, etc.).

2. User-Configured Widgets

In various embodiments, the user interaction application enables the user to customize widgets. For example, in some embodiments, the user interaction application enables the user to modify the preconfigured widgets. In some embodiments, the user interaction application enables the user to make and configure new widgets. In some embodiments, where the user edits existing or configures new widgets, the interaction application allows that user to assign any command, combination of commands, menu shortcuts, programming scripts, multiple strings, or key sequences to a single widget's UI object (e.g., buttons, icons, images, etc.). In the case where the user configures new widgets, the user acts as a third-party developer who creates new widgets. In various embodiments, a user may use widgets developed by any given third-party developer.

In some embodiments, the user interaction application may provide the user with preconfigured templates as a starting point to creating a fully customized widget that performs a variety of user-specified tasks. For example, the user interaction application may provide a preconfigured widget having Unix and/or Linux commands, which the user can reconfigure.

Embodiment for User-Configuration/Customization of a Widget

In some embodiments, the user interaction application enables the user to configure widgets on various devices. For example, in some embodiments, the user interaction application may enable the user to configure a widget on a user interaction device, on a primary device (e.g., a desktop computer), on a remote computer system or server (e.g., a system in the cloud), etc.

In various embodiments, the user interaction application enables the user to define and customize widgets using a suitable device such as a PC (MAC or Unix machine). The user interaction application enables the user to save the one or more widgets, and then download the one or more widgets to the user interaction device, upload the one or more widgets to the cloud (our cloud servers) or carry the one or more widgets on a portable device (e.g., on a flash memory device, hard disk, etc.).

In some embodiments, the user interaction application enables the user to move keys or elements around in the widget (e.g., on a keyboard of a keyboard widget) and/or in a region. In some embodiments, if a key exists that currently is not being displayed in a widget (e.g., keyboard) or region, the user interaction application may enable the user to request to view available keys or widgets. In some embodiments, these keys or widgets may show in a ghost format to the user. Once the user elects to add a key or widget, the key or widget anchors to the place that the user chooses and becomes part of the keyboard or region. As such, the key or widget is no longer a ghost. To create a new key that provides a function or macro, the user may use a desktop or cloud service to develop the key.

In some embodiments, the user interaction application provides a repository of buttons and/or commands. In some embodiments, the user interaction application enables the user to drag and drop buttons into an existing widget or into a new widget. In some embodiments, the user interaction application enables the user to create buttons from scratch. In some embodiments, the user interaction application enables the user to move buttons into place on the widget.

Additionally, when the user interaction application is running on hardware that has a particular interaction model enablement (e.g., motion sensing capabilities), the user interaction application will run corresponding widgets (e.g., motion-sensing widgets) or make those widgets available to the user.

The following are various example flows for providing the various embodiments described herein.

Figure 5:
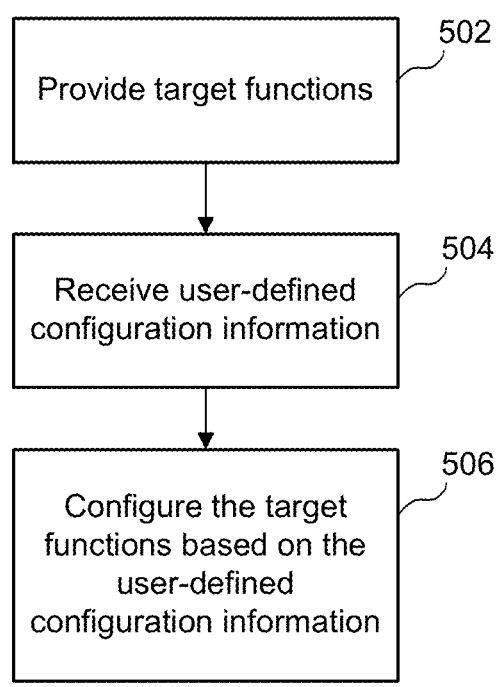
FIG. 5 illustrates an example simplified flow diagram for providing target functions to a user, according to some embodiments.

FIG. 5 illustrates an example simplified flow diagram for providing target functions to a user, according to some embodiments. As described in various embodiments herein, in block 502, the user interaction application provides one or more target functions to a user interaction device, where the one or more target functions enable user interaction with a primary device. In block 504, in various embodiments, the user interaction application receives user-defined configuration information for the one or more target functions. In block 506, the user interaction application configures the one or more target functions based on the user-defined configuration information.

Figure 6:
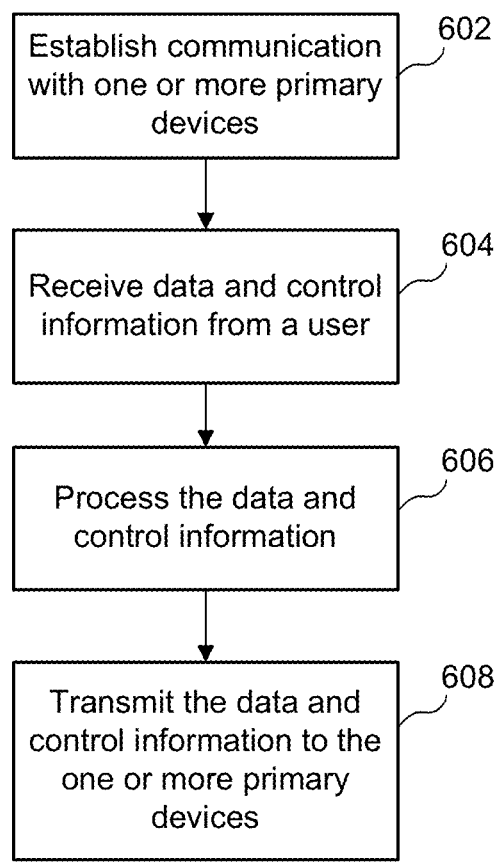
FIG. 6 illustrates an example simplified flow diagram for providing brokering functions between a user and a primary device, according to some embodiments.

FIG. 6 illustrates an example simplified flow diagram for providing brokering functions between a user and a primary device, according to some embodiments. As described in various embodiments herein, in block 602, the user interaction application establishes communication with one or more primary devices. In block 604, the user interaction application then receives data and control information from a user. In block 606, the user interaction application processes the data and control information. In block 608, the user interaction application then transmits the data and control information to the one or more primary devices.

In various embodiments, the control information that the user interaction application sends to the primary device controls the primary device by interacting with and controlling one or more applications on the primary device.

Figure 7:
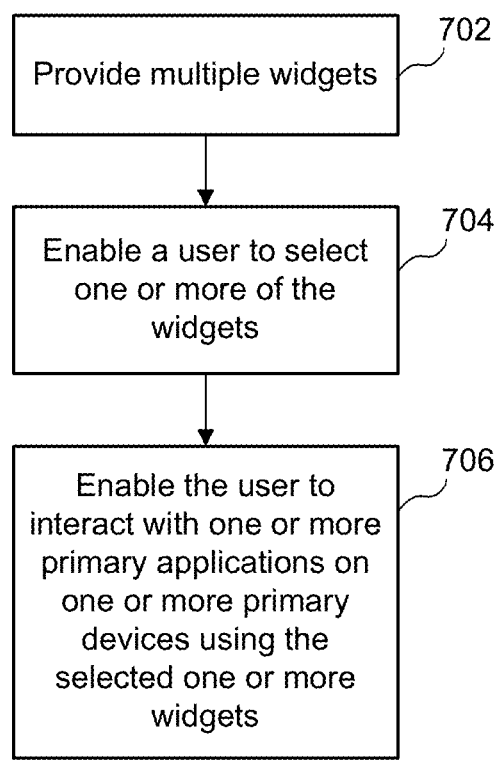
FIG. 7 illustrates an example simplified flow diagram for providing a selection of widgets to a user, according to some embodiments.

FIG. 7 illustrates an example simplified flow diagram for providing a selection of widgets to a user, according to some embodiments. As described in various embodiments herein, in block 702, the user interaction application provides multiple widgets. In some embodiments, one or more of the widgets are keyboards. Other examples of widgets are described in detail herein. In block 704, the user interaction application enables a user to select one or more widgets from the multiple widgets. In block 706, the user interaction application enables the user to interact with one or more primary applications on one or more primary devices using the selected one or more widgets. As described in various embodiments herein, the user interaction application enables the user to control the one or more primary devices by interacting with and controlling one or more applications on the one or more primary devices.

The following widgets are example embodiments of various types of widgets. The following embodiments are examples and the possible types of widgets available are not limited to the following example widgets.

Figure 8:
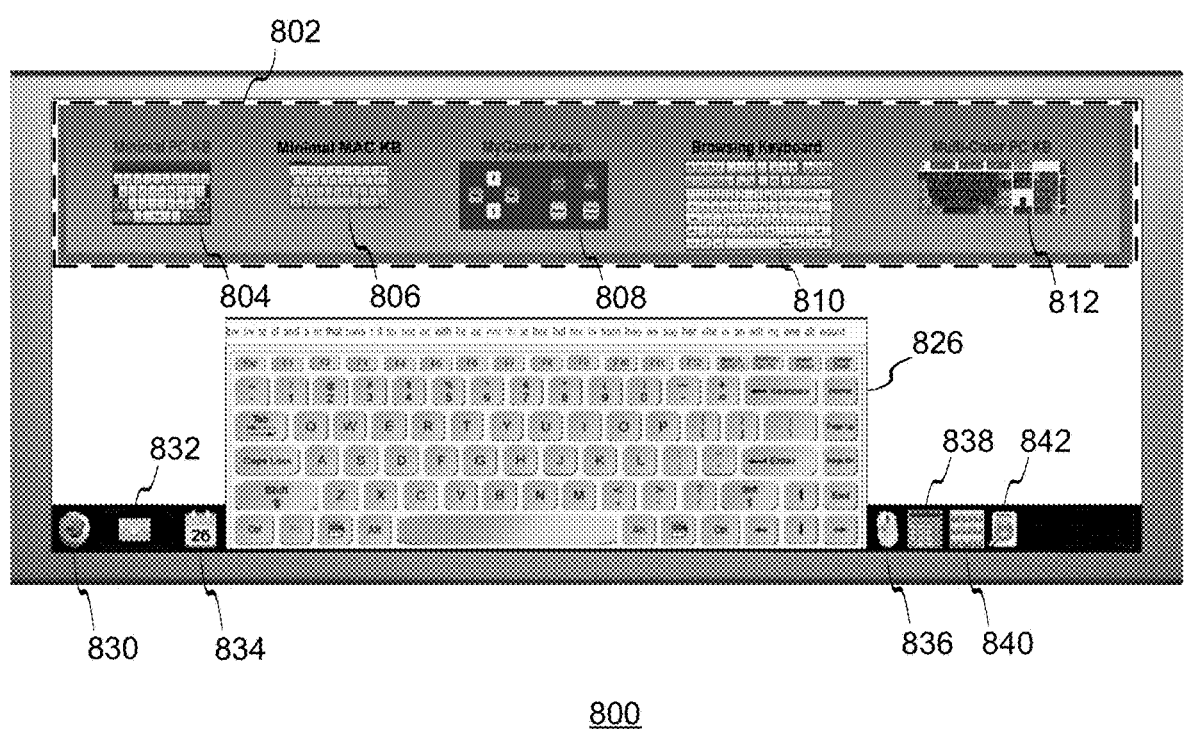
FIG. 8 illustrates an example simplified GUI showing an example selection of widgets, according to some embodiments.

FIG. 8 illustrates an example simplified GUI 800 showing an example selection of widgets, according to some embodiments. As shown, the user interaction application provides a selection 802 of widgets. In this particular example, the widgets include keyboard widgets 804, 806, 808, 810, and 812. In various embodiments, keyboard widgets 804, 806, 808, 810, and 812 are displayed in a manner that enables the user to view and ultimately select one or more widgets to activate. For example, keyboard widgets 804, 806, 808, 810, and 812 may be reduced in size and become full-sized when selected and activated. In some implementations, keyboard widgets 804, 806, 808, 810, and 812 may be icons that represent full-sized, fully functioning widgets when selected and activated.

For ease of illustration, five keyboard widgets are shown. In other embodiments, there may be any number of keyboard widgets, depending on the specific implementation. Furthermore, while this particular example embodiment shows the widgets being keyboard widgets, the user interaction application may display other types of widgets in a similar manner. For example, the user interaction application may display a selection of dock widgets. In various embodiments, the user interaction application may display different types of widgets. As described in various embodiments herein, the user interaction application may display a selection of widgets in various configurations. For example, the user interaction application may display widgets such that the user scrolls through a selection of widgets. In some embodiments, the user interaction application may enable the user to search a library for types of widgets or particular widgets (e.g., saved user-customized widgets).

In various embodiments, upon the user selecting a given widget (e.g., keyboard widget 806), the user interaction application causes a corresponding activated widget (e.g., keyboard widget 826) to be displayed.

Also shown, the user interaction application may cause user-selectable icons representing other widgets to be displayed. For example, as shown, the user interaction application may display a web browser icon 830, a message icon 832, a calendar icon 834, a screen navigation icon 836, a calculator icon 838, a number pad icon 840, a search icon 842, etc. to be displayed on the display screen of a user interaction device (and/or a primary device). These are example icons associated with widgets, and other types of icons and corresponding types of widgets are possible, depending on the specific implementation. Example embodiments associated with these icons are described in more detail below.

Figure 9:
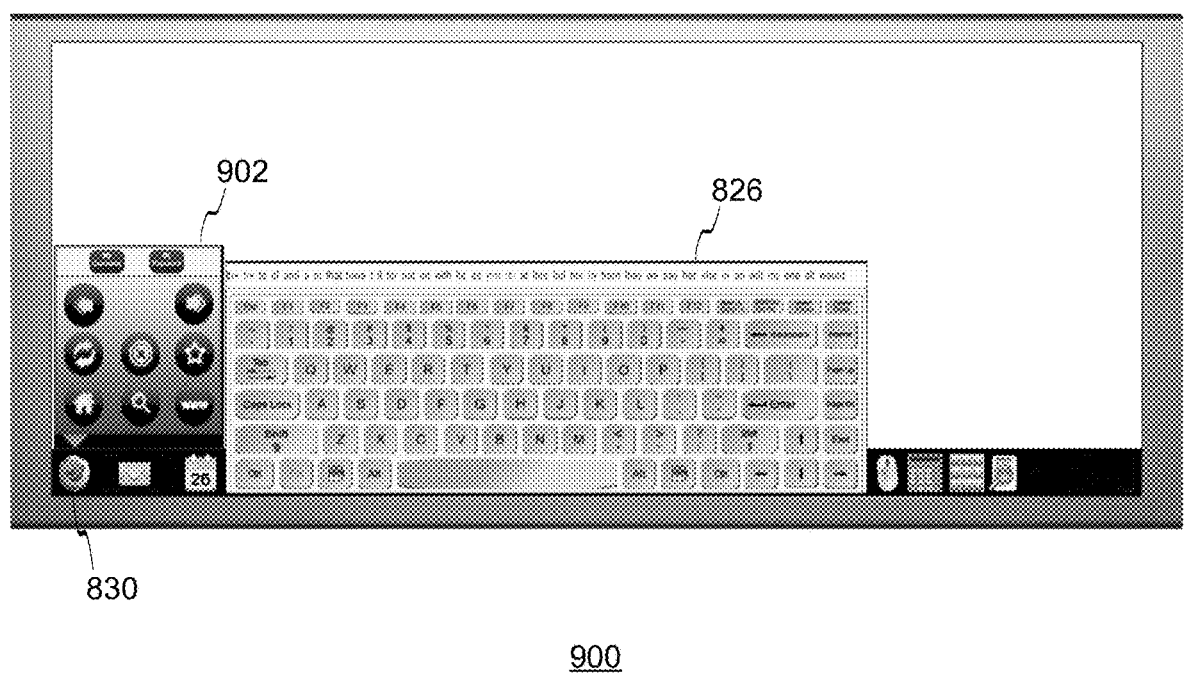
FIG. 9 illustrates an example simplified GUI showing an example web browser widget, according to some embodiments.

FIG. 9 illustrates an example simplified GUI 900 showing an example web browser widget 902, according to some embodiments. As shown, web browser widget 902 corresponds to web browser icon 830, and becomes expanded and activated when web browser icon 830 is selected by the user. The user interaction application may display a given widget in any predetermined location. For example, as shown, the user interaction application is displaying web browser widget 902 over web browser icon 830 and next to keyboard widget 826.

As shown, the user interaction application may display widget controls similar to those provided by a primary application of a primary device. In this particular example embodiment, the application is a web browser. As such, the user may control the primary application using the widget instead (or in addition to) the controls provided by the primary application. As shown, one of many benefits of the user interaction application providing controls on a widget is that the user may conveniently and quickly access controls. As shown, the controls of a given widget may be located in a convenient, predictable location in the user interaction device. Furthermore, as described in various embodiments herein, the user interaction application enables the user to not only customize widgets, but also to move widgets around one or more user interaction devices.

Figure 10:
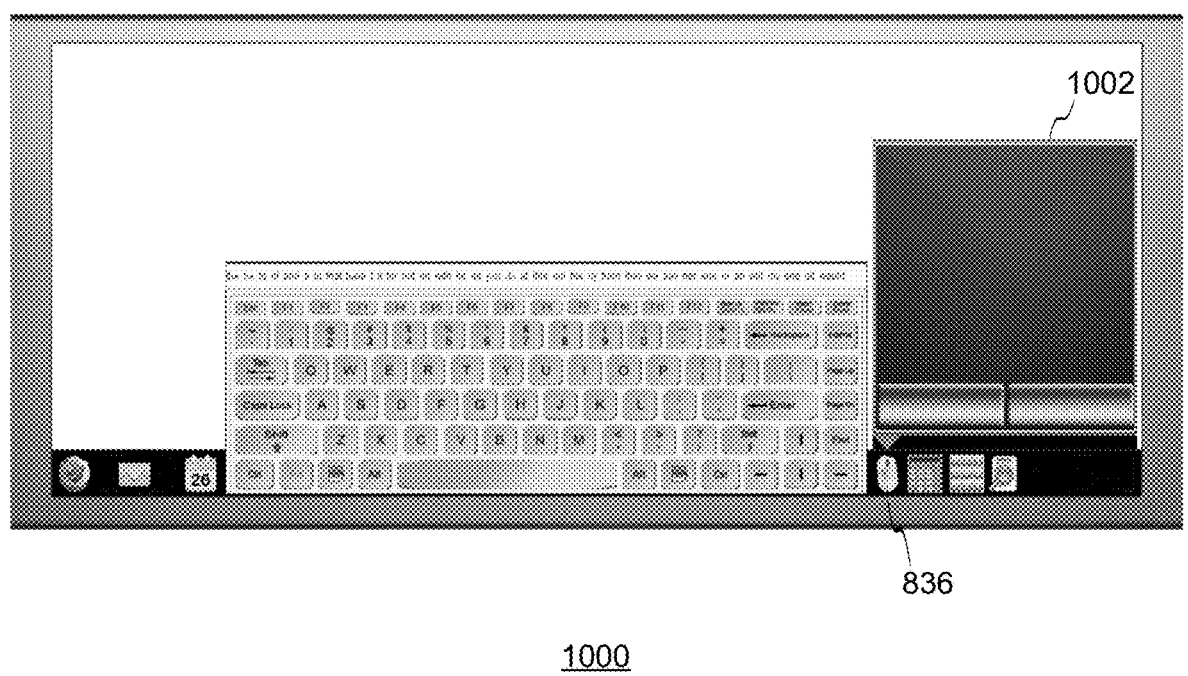
FIG. 10 illustrates an example simplified GUI showing an example screen navigation widget, according to some embodiments.

FIG. 10 illustrates an example simplified GUI 1000 showing an example screen navigation widget 1002, according to some embodiments. As shown, screen navigation widget 1002 corresponds to screen navigation icon 836, and becomes expanded and activated when screen navigation icon 836 is selected by the user.

As shown, screen navigation widget 1002 has track pad functions, including control buttons. This is one example of a screen navigation widget. In various embodiments, the user interaction application may provide other types of screen navigation widgets such as custom screen navigation widgets with multiple control buttons, track pads having varying sizes and shapes, etc. A benefit of such screen navigation widgets is that multiple screen navigation widgets may be used with multiple primary applications and with one or more primary devices. This would enable, for example, cutting and pasting from one or more particular primary applications (e.g., an email or web browser application, etc.) into other particular primary applications (e.g., a word processor application, etc.) without effecting clipboard items of different screen navigation widgets.

Figure 11:
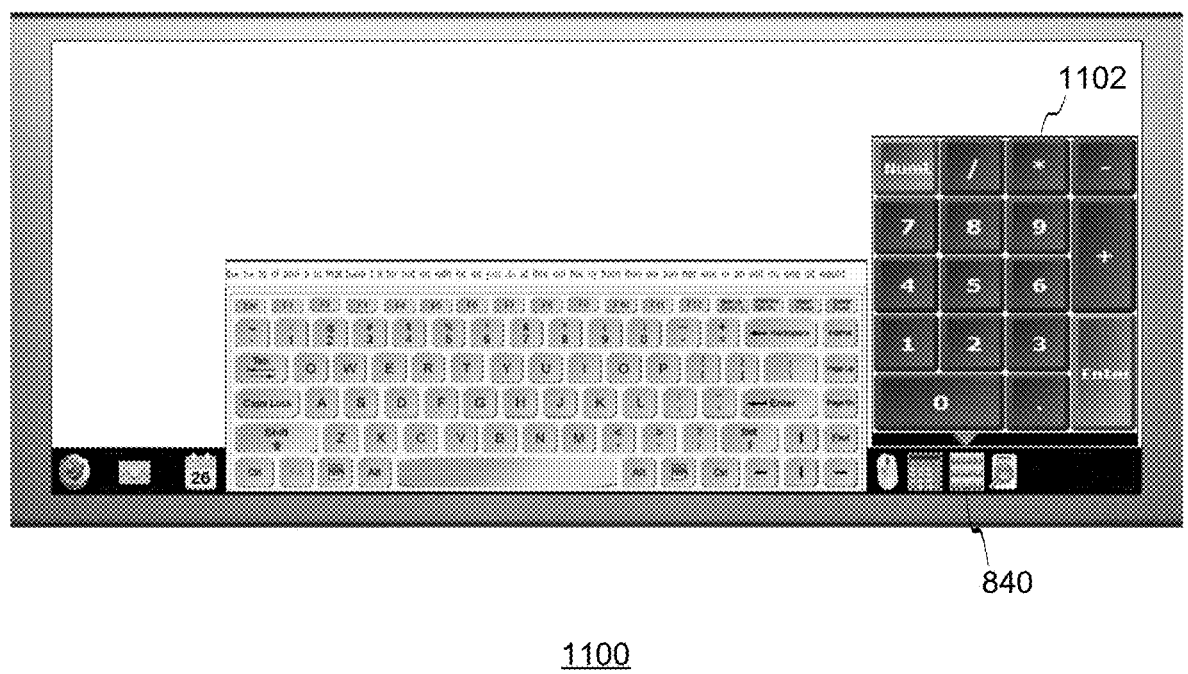
FIG. 11 illustrates an example simplified GUI showing an example number pad widget, according to some embodiments.

FIG. 11 illustrates an example simplified GUI 1100 showing an example number pad widget 1102, according to some embodiments. As shown, number pad widget 1102 corresponds to number pad icon 840, and becomes expanded and activated when number pad icon 840 is selected by the user. This particular example embodiment is one of many possible keyboard widgets.

Figure 12:
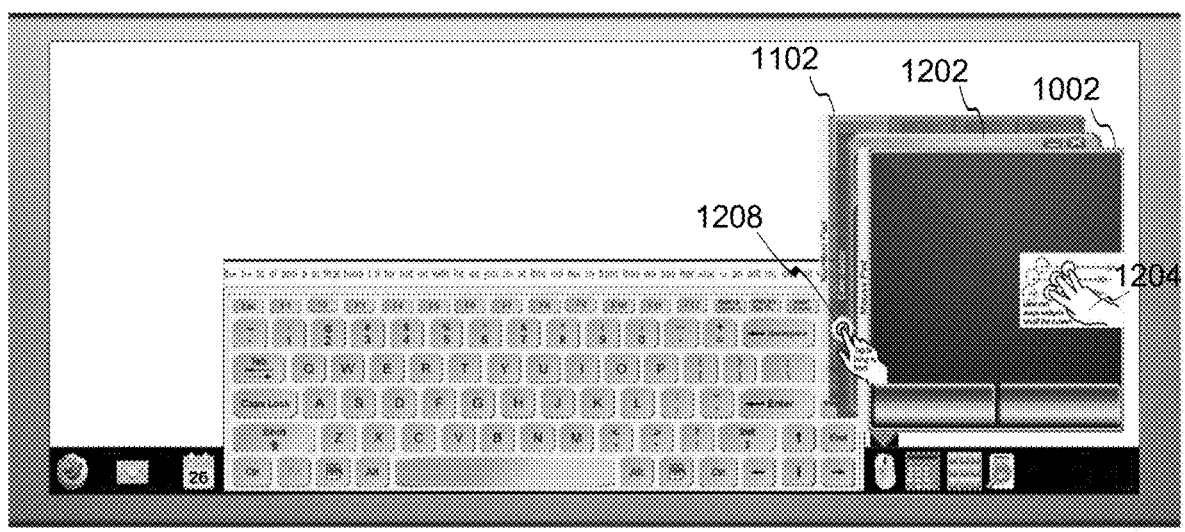
FIG. 12 illustrates an example simplified GUI showing an example layering of widgets, according to some embodiments.

FIG. 12 illustrates an example simplified GUI 1200 showing an example layering of widgets, according to some embodiments. FIG. 12 shows screen navigation widget 1002 partially overlaying a calculator widget 1202, which in turn is partially overlaying number pad widget 1102.

In various embodiments, the user interaction application enables the user to toggle widgets (as shown in image 1204) such that they shrink to icons or expand up to full-size widgets that display multiple functioning control features (e.g., keys, control buttons, control sliders, track pads). In some embodiments, where multiple widgets are open/expanded, the user interaction application may display the widgets in a layered configuration as shown. As described in various embodiments herein, the user interaction application enables the user to manipulate the layer of widgets in order to view hidden or partially hidden widgets. The user interaction application enables the user to further manipulate widgets by moving them around the GUI to different locations. In some embodiments, the user interaction application causes a selection button 1208 to be displayed, which enables the user to select one of several widgets move to the top of a stacked set of widgets.

D. Keyboard Widgets

In some embodiments, the user interaction application provides keyboard widgets that provide preconfigured keyboards and user-configured/customized keyboards to the user. In various embodiments, the keyboard widgets provide various keyboard functions. Generally, the keyboard widgets provide the user with multiple preconfigured and user-configured keyboards to select from at any given time for different purposes. Different types of keyboards are described in more detail below.

In some embodiments, the user interaction application enables the user to scroll through sets of keyboards for selection. In some embodiments, the user interaction application enables the user to scroll by swiping a finger right-to-left and left-to-right, or by using other gestures such as swiping four fingers downward or upward, etc. In various embodiments, the gestures may vary depending on the user interaction device. For example, in some embodiments, gestures for an optical user interaction device may be different than that of a touch screen device.

In some embodiments, the user interaction application enables the user to change orientation of a widget by using finger and thumb in a rotating gesture.

1. Preconfigured Keyboard Widgets

In some embodiments, the user interaction application provides keyboard widgets, which provide preconfigured keyboards to the user. Such preconfigured keyboards may include commonly used keyboards such as the QWERTY keyboard, keyboards for different languages, a number keypad, etc. Preconfigured keyboards may also include specialized keyboards such as one-handed keyboards. An example one-handed keyboard is described in more detail below.

2. User-Configured Keyboard Widgets

In various embodiments, keyboard widgets enable the user to customize keyboards. For example, the user may modify any one or more preconfigured keyboards or may create a new keyboard from scratch.

In some embodiments, keyboard widgets may provide the user with preconfigured templates as a starting point to creating a fully customized keyboard.

In various embodiments, the user interaction application provides ergonomic functionalities such as ergonomic keyboards for the user. For example, a user interaction application on a single user interaction device may provide a representation of a full-size ergonomic keyboard. In some embodiments, the user interaction application may display two separate and independent, complimentary halves of a keyboard on the display screen of the user interaction device. For example, the user interaction application may display a left portion of the keyboard on the left-hand side of a keyboard region, and display the right portion of the keyboard on the right-hand side of the keyboard region.

In some embodiments, the left portion of the keyboard may provide the left half of the QWERTY keyboard, and the right portion of the keyboard may provide the right half of the QWERTY keyboard. The QWERTY keyboard layout is only one particular example. Other keyboard layouts and configurations are possible. For example, as described in more detail below, the user interaction application provides many different types of preconfigured and user-customizable keyboards, including, but not limited to alpha-numeric keyboards or keyboards in different languages.

With regard to ergonomic aspects, in some embodiments, the user interaction application enables representations of each half of a keyboard to be rotated (e.g., such that the top of the left-hand and right-hand keyboard representations are directed toward each other to varying degrees depending on an optimal ergonomic orientation and/or user preference. For example, the user interaction application enables the user to configure the degree of rotation of each keyboard portion.

Because the user interaction application enables a user to customize an interaction device to function as a customized keyboard, the user may customize one user interaction device to function as a left half of a keyboard (e.g., QWERTY keyboard) and may customize a different user interaction device to function as a right half of the keyboard (e.g., each displaying a different representation of a complimentary half of the keyboard). If the user elects to use the two user interaction devices without physically connecting them, each one may be oriented and separated at a distance as desired by the user.

In some embodiments, the user interaction application may associate any command, combination of commands, menu shortcuts, programming scripts, multiple strings, or key sequences with a single key. This enables the user to select the single key to achieve the same effect as selecting multiple keys. In some embodiments, the user interaction application enables the user to design and associate any desired icon, picture, or text on a key.

3. One-Handed Keyboard Widget

In some embodiments, the user interaction application may provide a one-handed keyboard widget. The embodiments described herein with regard to widgets in general and to keyboard widgets also apply to the one-handed keyboard widget. In some embodiments, the one-handed keyboard may include keys, a data entry screen, an auto-suggest section, etc. In some embodiments, the user interaction application enables the user to program and assign any key to any letter or combination of control keys and letters or any combination letters. In some embodiments, the user interaction application enables the user to resize, re-shape, and/or move around the widget regions.

4. Auto-Suggest and User Feedback Feature

In some embodiments, the user interaction application may show action messages or typing on the top display area of the input device (if the area is available and unused by another function) and then fade it out, to give user real time feedback on the action just performed by the user.

In some embodiments, the user interaction application provides auto word and phrase suggestions to the user as the user types. The auto suggestions may be displayed at a predefined location on the display screen of the user interaction device. In some embodiments, the user interaction application enables the user to scroll through suggestions (e.g., by swiping a finger) and to select (e.g., by touching, tapping, etc.) any of the suggestions. As a result of selecting a suggestion, the user interaction application displays the selected word at a predefined location on the display screen of the user interaction device (e.g., in a text entry field of an appropriate region).

In some embodiments, when the user types in a single letter, the user interaction application accesses a word/phrase library, or suggestion library. The suggestion library contains a list of commonly used words and phrases in the user's selected language and contains any words or phrases that the user had previously defined/saved that match the typed character/letter or combination of typed letters in any position of the word. When the user interaction application has Internet access, the user interaction application accesses any suitable library in the cloud, which may provide a larger, up-to-date set of words and phrases. In some embodiments, the user interaction application may populate the suggestion library through crowd sourcing. In some embodiments, as a community repeatedly accesses new words and phrases, the user interaction application may add the words and phrases to the suggestion library. When the user interaction application does not have Internet access, the user interaction application relies on its local copy of the suggestion library. As the user continues to type more letters, the user interaction application displays words and/or phrases that match the typed sequence of characters/letters in any position of the word. The order in which the user interaction application displays the word and/or phrase may be based on the frequency of the word usage in that language and/or the frequency that the word has been used by the crowd using the word/suggestion library.

In some embodiments, the system sends the user-inputted text to the primary device as the user types in the text. In some embodiments, the system adds text based on a selected spelling suggested, and then sends the user-inputted text to the primary device in predetermined groups of text. As a result, as the user types text into the user interaction device, the user can also view the text on the primary device (e.g., personal computer, tablet, mobile device, etc.).

In some embodiments, the user interaction application learns most used, recently used user key strokes or recently typed words and provides enhanced suggestions to the user.

In some embodiments, when the user enters a word, phrase, or set of characters, etc. that are not part of an auto-spelling/auto-suggestion feature, the user interaction application remembers the word, phrase, or set of characters, etc. Thereafter, the user interaction application displays the word, phrase, or set of characters, etc. to the user as an option when that user begins to enter a sequence that matches it.

In some embodiments, after the user interaction application has captured a predefined amount of text, the user interaction application may transmit the text to the primary device. In some embodiments, the predefined amount of text may be based on a policy. For example, in some embodiments, the predefined amount of text may be defined by a number of bits, number of words, etc. In some embodiments, the predefined amount of text may be determined by the user, where, for example, the user may press an "enter" button to send the text shown in a viewer to the primary device.

While embodiments described herein are defined in the context of typed words, phrases, or sets of characters, etc., the user interaction application may also employ voice recognition algorithms to provide suggestions for non-typed entries (e.g., voice recognized words and/or phrases, etc.).

In some embodiments, the user interaction application may show action messages on the top area of the GUI of the user interaction device (if the area is available and unused) and then fade the action message out, to give the user real time feedback. In some embodiments, action messages may provide feedback to the user that a particular change in region layout has been saved. Alternatively, these action messages may be displayed directly on the interaction device and/or on the display device.

5. Keyboard Keys

In various embodiments, a key may be a button that represents an alphanumeric character or any other symbol in any particular natural language. In some embodiments, the user interaction application enables the user to customize keys, where any given key may be given any particular meaning or function (e.g. commands, combination of commands, menu shortcuts, programming scripts, multiple strings or key sequences). Such user-customization is described in more detail below.

In some embodiments, keys may be provided in predetermined keyboard templates. Key may include but are not limited to QWERTY keyboard keys, game controller keys, one-handed keyboard keys, etc. In some embodiments, the user may use letters, pictures, or icons for any key designation. For example, the user may program and assign any key to any letter, command, combination of commands, menu shortcuts, programming scripts, multiple strings, or key sequences. As an example the user can program and assign any key to contain any combination of words such as a username or password or sentences. In some embodiments, the user can resize or reshape any key.

In some embodiments, the user can define and customize any gestures such as but not limited to 1, 2, 3, 4, 5, or more finger swipes (e.g., with two hands) in any direction to perform one or more actions on a user interaction device.

In various embodiments, the user interaction device may display or present keys to the user in a variety of ways. For example, in some embodiments, the user interaction application may provide rolling keys that are on a scrolling wheel. In some embodiments, the user interaction application may provide scrolling keyboards, scrolling symbols (alpha-numeric characters, numbers, and punctuation). In some embodiments, the user interaction application may provide a carousel of keyboards, carousel of symbols, carousel of widgets. In some embodiments, the user interaction application may provide keys that are visually formed like a 3-D cube that you can turn and use. In some embodiments, the user interaction application may provide keys that are visually formed like a 3-D sphere that user can roll around to get to the desired letter. In some embodiments, the user interaction application may enable the user to use number of taps and duration on a single key location to indicate different letters. In some embodiments, the user interaction application may provide multiple alphanumeric symbols that are stacked in square layers, where the user can tap a corner of each layer to access the desired layer. In some embodiments, the user interaction application may detect the user's palm of the user's hand placement to make the device act as mouse or as an input device. In some embodiments, the user interaction application detects the velocity of each finger strike, where each velocity has a different meaning and/or result. In some embodiments, the user interaction application detects the time that each finger maintains contact with a key, where each amount of time has a different meaning and/or result. In some embodiments, the user interaction application may enable the user to color code items within a carousel (most frequently used keyboards can be distinguished from least frequently used). In some embodiments, the user interaction application may enable the user to select a keyboard/widget/symbol directly by touch without the target needing to be front and center (spinning/scrolling not required).

6. Encryption

In some embodiments, the user interaction application may enable and facilitate the user in accessing various secure domains such as secure applications, website applications, website portals, website accounts, networks, etc. For example, in some embodiments, the user interaction application may enable a user interaction device to function as a secure identity form factor for transmitting passwords securely to secure domains.

In some embodiments, the user interaction application may receive a user name and password from the user, where the user name and password are associated with a particular secure domain. The user interaction application saves the user name and password in any suitable memory (e.g., memory in the user interaction device). When needed, the user interaction application retrieves the user name and password, and then sends the user name and password to the associated secure domain (e.g., login screen of a website portal, etc.). Accordingly, the user would not need to remember and manually enter the user's user name and password. While one set of a user name and password is described, this example embodiment also applies to multiple user names and passwords associated with multiple secure domains.

For security purposes, in some embodiments, the user interaction application may encrypt all saved user names and passwords. The user interaction application may also encrypt all saved information and metadata associated with each user name and password set (e.g., any information associated with the associated secure domain).

In some embodiments, the user interaction application may enable the user to set a user name and password for the corresponding user interaction device and/or any portion of the user interaction application (e.g., security functionality, etc.).

In some embodiments, the user interaction application determines which user name and password corresponds to the secure domain that the user is attempting to access. For example, in some embodiments, when the user is at a particular secure domain (e.g., at the login page), the user interaction application enables the user to trigger the sending of the associated user name and password to the appropriate data entry fields of the secure domain. The user interaction application automatically determines such data entry fields and enters the information. In some embodiments, the user may select (e.g., by tap or touch) a preconfigured or customized key on the user interaction device to trigger this process. The key may be located in any one or more functional regions (e.g., in any widget, etc.). In some embodiments, the user interaction application automatically submits the information (e.g., selects "Enter," etc.), or optionally allows the user to submit the information. Accordingly, the user would not need to remember and manually enter the user's user name and password. In some embodiments, the user interaction application may require the user to at least enter a user name and password for the user interaction application, or portion thereof. This prevents anyone else using (e.g., borrowing, etc.) the user interaction device from accessing any secure domains of the user who owns the user interaction device.

C. Dock Widgets

In some embodiments, the user interaction application provides dock/tray widgets that provide preconfigured docks and user-configured/customized docks to the user.

1. Preconfigured Dock Widgets

In some embodiments, dock widget may provide a pre-configured dock. The pre-configured dock may include UI objects (e.g., icons, etc.) for applications (such as word processor applications, spreadsheet applications, presentation applications, drawing applications, game applications, etc.) that are available on the primary device that are retrieved by the user application software and displayed on the user interaction device. In various embodiments, these applications may be applications that are available in Windows "quick launch" in the case of a Windows machine, or applications that are available in Apple's "Dock" in case of an Apple machine.

2. User-Configured Dock Widgets

In some embodiments, the user interaction application enables the user to modify the preconfigured docks. In some embodiments, the user interaction application enables the user to configure new docks from scratch or add application icons (available on the primary device) to a pre-configured dock. In some embodiments, the user interaction application may even delete items from a pre-configured dock. In this case, the user may act as a third-party developer who creates new customized docks.

The following is an example simplified flow for displaying selectable items on the display screen of a user interaction device, according to some embodiments. A method is initiated, where the user interaction application accesses one or more selectable items. In some embodiments, the selectable items on the user interaction device may represent selectable links, icons, buttons, and/or thumbnails that are displayed on the display screen of a primary device. In various embodiments, these selectable items may include links that result in navigation, or other action based links (e.g., scripts). For example, in various embodiments, "selectable items" may include short cut icons, control buttons, navigation buttons, menu items, etc. Selectable items may also include links such as hypertext links, control links (e.g., sign out/log out links), etc.

In some embodiments, some of the selectable items might not be currently displayed on the display screen of the user device, but are capable of being displayed on the display screen depending on user actions. For example, some selectable items such as menu items require the user to first click on a menu bar to cause a menu to be displayed. Once a given menu item is visible, the user may then select it.

3. Pulling Docks from a Primary Device and Displaying them on a User Interaction Device These selectable items may include applications, documents, tasks, etc. As indicated above, in some embodiments, dock widget may provide a pre-configured dock. The pre-configured dock may include the UI objects (e.g., icons, etc.) for applications (such as word processor applications, spreadsheet applications, presentation applications, drawing applications, game applications, etc.) that are available on the primary device and that are retrieved by the user application software and displayed on the user interaction device. In various embodiments, these applications may be applications that are available in Windows "quick launch" in the case of a Windows machine, or applications that are available in Apple's "Dock" in case of an Apple machine.

In some embodiments, the selectable items may include a predetermined set of launch buttons for applications. For example, a set of launch buttons may include Quick Launch shortcuts, Apple/Mac dock shortcuts, Grab shortcuts. In various embodiments, shortcuts are icons that points to applications, files, commands, operations, etc.

In some embodiments, the selectable items may be displayed in a predetermined layout. For example, in various embodiments, different templates may be associated with different applications and/or different websites, where each template has a different layout. For example, in some embodiments, there may be a predefined template for popular websites and webmail such as Facebook, Twitter, Hotmail, Gmail, Yahoo mail, etc.

In some embodiments, the system may enable users to modify the templates (e.g., add or remove selectable items, rearrange the selectable items to different locations within the template, etc.).

In various embodiments, the system displays one or more user application icons on the display screen of the user input device, where the application icons are associated with a primary device. For example, the application icons may include application icons associated with a Windows Quick Launch menu or with an Apple/Mac dock menu.

In some embodiments, the system displays the application icons automatically when the user input device establishes connection with the primary device. In some embodiments, the system displays the application icons when the user selects an application menu icon on the display screen of the user input device.

In some embodiments, the system provides an application menu region. The system then provides application icons in the menu region. In some embodiments, to provide the application icons, the system initiates communication with the operating system of the primary device. The system then retrieves application information from the operating system of the primary device. The system then displays icons in the application menu region, where each icon is associated with a corresponding application.

In some embodiments, the user interaction application communicates with the primary device and gets a list of all available applications on the primary device along with their icon thumbnails and the location of the executable file for each available application that is run by the operating system of the primary device. In some embodiments, the system displays shortcut icons in the application menu region, where the shortcut icons are associated with the corresponding applications.

In some embodiments, the dock widget presents the user with application icons. In some embodiments, the user may scroll through application icons in an application menu region displayed on the user interaction device. If a user selects (e.g., taps) any of the application icons (or shortcut icons), the system initiates contact with the operating system of the primary device (e.g., the Windows machine, Apple machine, etc.) in order to launch the associated application.

In some embodiments, the user interaction application enables the user to access application icons that are not in the dock or quick launch but are installed on the computer. The user interaction application has access to any application installed on the computer. For the applications that are not on the dock or quick launch, the user interaction application enables the user to request to see more applications. The user interaction application may then pull and display the additional icons.

In some embodiments, as part of being able to customize widgets, a user may add tags to each widget element. The user interaction application enables the user to use these tags to associate or group similar widgets. In some embodiments, the user interaction application enables the user to tag the application icons, such that application icons that are similar can be displayed together. As such, the user can choose to view the application icons in a particular order on their quick launch or dock. For example, they can choose to view the icons alphabetically or they can choose to view them by tags.

In some embodiments, the user interaction application interacts with the operating system (OS) of the primary device (e.g., iPhone, PC, etc.) when performing these embodiments.

4. Pulling Links from a Web Page and Displaying on a User Interaction Device

D. Web Page Widget

In some embodiments, the user interaction application transfers selectable items from a web page to preconfigured and/or user configured web page widgets on the user interaction device.

1. Preconfigured Widgets

In some embodiments, the user interaction application provides preconfigured web page widgets to the user. Such preconfigured web page widgets may include UI objects (e.g., buttons, icons, images, etc.) for particular functionalities corresponding to selectable items on the current web page. Preconfigured web page widgets may also include UI objects for particular online applications (e.g., remote cloud-based applications such as word processor applications, spreadsheet applications, presentation applications, drawing applications, game applications, etc.). Preconfigured web page widgets may also include UI objects for particular websites (e.g., email websites, social networking websites, etc.). Preconfigured web page widgets may also include UI objects for browser control (e.g. bookmark, refresh, back & forward buttons, etc.).

2. User-Configured Widgets

In various embodiments, the user interaction application enables the user to customize web page widgets. For example, in some embodiments, the user interaction application enables the user to modify the preconfigured web page widgets. In some embodiments, the user interaction application enables the user to configure new web page widgets. In the case where the user configures new web page widgets, the user acts as a third-party developer who creates new web page widgets. In various embodiments, a user may use web page widgets developed by any given third-party developer.

In some embodiments, the user interaction application may provide the user with preconfigured templates as a starting point to creating a fully customized web page widget that performs a variety of user-specified tasks.

The following describes various embodiments of web page widgets. In some embodiments, if the user interaction application detects that a browser is open in the primary device, the user interaction application searches for selectable items on the current web page that are displayed in the browser. The user interaction application dynamically pulls the selectable items from the current web page and displays the selectable items on the user interaction device. In some embodiments, the user interaction application may present the selectable items to the user in a widget. For example, in some embodiments, the user interaction application may display the selectable items in the web page widget, where links may be links for navigation (e.g., hyperlink to another page) or for scripts (e.g., logout link). In some embodiments, the links may include any selectable items such as selectable buttons, icons, thumbnails, etc.

In some embodiments, the user interaction application may access the one or more selectable items from a website and display the selectable items on the user interaction device in real-time. For example, in some embodiments, the system may access links, web page menu items and/or buttons from HyperText Markup Language (HTML) source code of the website and then display one or more of the links on the input device.

In some embodiments, the user interaction application may arrange the selectable items (e.g., links, etc.) similarly to their arrangement on the display screen of the primary device (e.g., as arranged according to the HTML source code). This relative mapping between the display screen of the user interaction device and the primary device facilitates the user in locating and selecting selectable items. In some scenarios, where particular selectable items (e.g., sign out link, privacy link, etc.) are not readily visible on the display screen of the primary device, the same selectable item may be visible and thus readily selectable on the user interaction device.

In some embodiments, the user interaction application may arrange the selectable items (e.g., links, menu buttons, etc.) in a predetermined layout, such as a layout provided by a preconfigured web page widget as described above. In some embodiments, the system may enable the user to arrange the selectable items in a user-defined predetermined layout, such as a layout provided by a user-configured web page widget as described above.

In various scenarios, the user interaction application may use the same type of control buttons or links (e.g., sign-out link) provided by the current web page, but in a predictable layout of a preconfigured or user-configured web page widget. As such, a predictable layout would facilitate the user in quickly selecting similar selectable objects (sign-in links, log-out links, etc.) in different websites. For example, in some embodiments, a sign out link in the web page widget may be located in the lower left-hand corner of a window on the input device, or in any other predictable location.

In some embodiments, the user interaction application may modify the size and/or shape of selectable items to predetermined sizes and shapes. For example, the user interaction application may enlarge the selectable items such that they are easier for a user select. In some embodiments, the user interaction application may enable the user to modify the predetermined sizes and shapes of the selectable items. In some embodiments, the user interaction application may modify the color of selectable items (e.g., sign out link on the user device becomes a red button on the input device).

In some embodiments, the user interaction application may access a predefined number of selectable items from a website (e.g., 2, 3, 4, or more). In some embodiments, because there may be a larger number of selectable items on a given website than the predefined number, the user interaction application may determine which selectable items to use based on a predefined policy. For example, the user interaction application may select the selectable items that are most frequently used (e.g., home link, sign in link, sign out link, etc.). In some embodiments, the user interaction application may use a predetermined template for selecting which selectable items to display and how they are to be arranged. In some embodiments, the user interaction application may enable the user to indicate which selectable items to use, either by modifying a template or by creating a new template.

E. Additional Embodiments Associated with Widgets

In some embodiments, the user may move or re-size user interface objects/features such as keys, buttons, widgets, etc., as well as functional regions and widgets by pressing and holding the item. In some embodiments, a user interface object may be highlighted to indicate to the user that it can be moved or re-sized.

In some embodiments, the user interaction application enables the user to move a widget into any position (e.g., in a docked position in a functional region), or to layer widgets over or under other stacked widgets (e.g., in a tiled or tabbed configuration, in horizontal or vertical stacks, in hidden mode or visible mode, etc.).

In some embodiments, the user interaction application may also display all active widgets simultaneously by zooming out, such that the user interaction display screen functions as a viewfinder to view all active widgets. In this scenario, all of the widgets are displayed on a virtual canvas that may be larger than the size of the user interaction display screen. In some embodiments, the user may pan around or zoom in to a particular section of the virtual canvas to interact with a particular widget.

In some embodiments, the default for some widgets may be in a hidden mode, and there may be an option to either view or not view the hidden tools when the user zooms out to view all tools (e.g., "view all tools" or "do not view hidden tools" user options).

F. Tutorials

In some embodiments, the user interaction application provides tutorial buttons that are located in predetermined locations (e.g., upper right corner of a region).

G. Portable Software Configurations

In various embodiments, the user interaction application stores user preferences and configurations in a configuration file. The configuration file is portable. For example, the configuration file may be transferred from one user interaction device to another. In some embodiments, a given configuration file may be shared among users. The configuration file may be stored in any suitable storage location (e.g., on a user interaction device, on a memory stick, on a primary device, on an external drive, on a cloud server, etc.).

In some embodiments, the user interaction application may communicate with a desktop software application, a browser plug-in, or online service (via an Internet connection), where the user has saved the user's configurations. The user interaction application requests a list of saved configurations and stores the configurations on the user interaction device or on a primary device. The user interaction application displays a visual menu of the user's saved configurations on the user interaction device. In some embodiments, the user may access the menu by requesting it (e.g., by tapping a collapsed panel). The user may scroll through the menu to see snapshot previews of the configurations. The user may select any saved configurations on the user interaction device. When the user selects a new configuration, the user interaction application will then respond to the request by displaying the widgets and layouts and connecting to devices specified in the selected configuration. The user may change the configuration that is running on the user interaction device by moving widgets around, drawing regions, associating widgets to regions, removing widgets, hiding or showing widgets by default, and rearranging user interaction device modules. The user interaction application remembers the configuration changes and displays the configuration back in the same manner the user left it.

In some embodiments, the user interaction application enables multiple configurations to run, so that multiple users can use the same user interaction device to interact with multiple primary devices simultaneously.

IV. Social Network Platform

In some embodiments, the user interaction platform may be implemented in a social networking environment. In some embodiments, the user interaction application may enable a community of users to post their customized widgets on the community server/website. In some embodiments, the user interaction platform provides a mean for testing and approving widgets before they are posted for the public to use.

In some embodiments, the user interaction platform (i.e., user interaction application, user interaction device, and associated user interaction web site and user interaction cloud server(s), etc.) provides users with an option to charge for their customized widgets.

Although the description has been described with respect to particular embodiments thereof, these particular embodiments are merely illustrative, and not restrictive.

Furthermore, as indicated above, headings are used herein for readability. The various embodiments and features described herein under a single heading need not be implemented together in the same implementations under the single heading. In other words, embodiments and features described under a single heading may be implemented together in whole or in part with embodiments and features described under other headings. Various embodiments and features described under different headings may be implemented in different combinations with embodiments and features described under other headings.

Any suitable programming language and/or scripting language may be used to implement the routines of particular embodiments including C, C++, Java, assembly language, etc., and including markup languages such as HTML, HTML5, etc. Different programming techniques may be employed such as procedural or object-oriented. The routines may execute on a single processing device or on multiple processors. Although the steps, operations, or computations may be presented in a specific order, the order may be changed in particular embodiments. In some particular embodiments, multiple steps shown as sequential in this specification may be performed at the same time.

Particular embodiments may be implemented in a computer-readable storage medium (also referred to as a machine-readable storage medium) for use by or in connection with an instruction execution system, apparatus, system, or device. Particular embodiments may be implemented in the form of control logic in software or hardware or a combination of both. The control logic, when executed by one or more processors, may be operable to perform that which is described in particular embodiments.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real time," "offline," in a "batch mode," etc. Portions of processing may be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

Particular embodiments may be implemented by using a programmed general purpose digital computer, by using application specific integrated circuits, programmable logic devices, field programmable gate arrays, optical, chemical, biological, quantum or nano-engineered systems, components and mechanisms. In general, the functions of particular embodiments may be achieved by any means known in the art. Distributed, networked systems, components, and/or circuits may be used.

It will also be appreciated that one or more of the elements depicted in the drawings/figures may also be implemented in a more separated or integrated manner, or even removed or rendered as inoperable in certain cases, as is useful in accordance with a particular application. It is also within the spirit and scope to implement a program or code that is stored in a machine-readable medium to permit a computer to perform any of the methods described above.

As used in the description herein and throughout the claims that follow, "a", "an", and "the" include plural references unless the context clearly dictates otherwise. Also, as used in the description herein and throughout the claims that follow, the meaning of "in" includes "in" and "on" unless the context clearly dictates otherwise.

While one or more implementations have been described by way of example and in terms of the specific embodiments, it is to be understood that the implementations are not limited to the disclosed embodiments. To the contrary, they are intended to cover various modifications and similar arrangements as would be apparent to those skilled in the art. Therefore, the scope of the appended claims should be accorded the broadest interpretation so as to encompass all such modifications and similar arrangements.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

What is claimed is:

1. A computer-implemented method comprising:
providing, at a user interaction device, one or more target functions, wherein each of the one or more target functions includes a plurality of controls that enable user interaction with at least one application associated with at least one primary device;
detecting the at least one application being launched on the at least one primary device;
determining one or more target functions, wherein each of the one or more target functions includes one or more controls that enable user interaction with the at least one application, and wherein at least one of the controls of each target function of the one or more target functions is specific to the at least one application;
receiving, from the at least one primary device, control information associated with the one or more controls of the one or more target functions;
receiving, from the at least one primary device, data information associated with the at least one application;
displaying the one or more controls of the one or more target functions on a display screen associated with the user interaction device, wherein controls of a first target function of the one or more target functions are displayed in a first functional region, and wherein controls of a second target function of the one or more target functions are displayed in a second functional region;
displaying the data information from the at least one primary device on the display screen associated with the user interaction device;
providing a visual canvas that contains one or more available widgets, wherein a first widget of the one or more available widgets corresponds to the first functional region, wherein a second widget of the one or more available widgets corresponds to the second functional region, and wherein the visual canvas expands to a size that is larger that the display screen; and
enabling a user to pan the visual canvas to view and access the one or more available widgets.

2. The method of claim 1, further comprising:
displaying the first functional region across the first user interaction device; and
displaying the second functional region across the first user interaction device and a second user interaction device, wherein the first functional region and the second functional region are displayed simultaneously.

3. The method of claim 1, wherein the one or more target functions enable a user to control, using the user interaction device, a web browser running on the at least one primary device, wherein the one or more target functions are associated with the web browser, and wherein the method further comprises enabling a user to move the one or more target functions that control the web browser to different positions on the user interaction device.

4. The method of claim 1, further comprising preloading widgets based on historical usage for immediate use to the user.

5. The method of claim 1, wherein the one or more controls of the one or more target functions are specific to a second application that is launched on the at least one primary device.

6. A non-transitory computer-readable storage medium carrying one or more sequences of instructions thereon, the instructions when executed by a processor cause the processor to perform operations comprising:
providing, at a user interaction device, one or more target functions, wherein each of the one or more target functions includes a plurality of controls that enable user interaction with at least one application associated with at least one primary device;
detecting the at least one application being launched on the at least one primary device;
determining one or more target functions, wherein each of the one or more target functions includes one or more controls that enable user interaction with the at least one application, and wherein at least one of the controls of each target function of the one or more target functions is specific to the at least one application;
receiving, from the at least one primary device, control information associated with the one or more controls of the one or more target functions;
receiving, from the at least one primary device, data information associated with the at least one application;
displaying the one or more controls of the one or more target functions on a display screen associated with the user interaction device, wherein controls of a first target function of the one or more target functions are displayed in a first functional region, and wherein controls of a second target function of the one or more target functions are displayed in a second functional region;
displaying the data information from the at least one primary device on the display screen associated with the user interaction device;
providing a visual canvas that contains one or more available widgets, wherein a first widget of the one or more available widgets corresponds to the first functional region, wherein a second widget of the one or more available widgets corresponds to the second functional region, and wherein the visual canvas expands to a size that is larger that the display screen; and enabling a user to pan the visual canvas to view and access the one or more available widgets.

7. The computer-readable storage medium of claim 6, wherein the user interaction device is a tablet computer.

8. The computer-readable storage medium of claim 6, wherein the at least one primary device is a computer system that is remote from the user interaction device.

9. The computer-readable storage medium of claim 6, wherein a user-defined configuration information configures the user interaction device for one or more target functions.

10. The computer-readable storage medium of claim 6, wherein the one or more target functions enable a user to interact with applications running on the at least one primary device.

11. The computer-readable storage medium of claim 6, wherein the one or more target functions enable a user to control applications running on the at least one primary device.

12. The computer-readable storage medium of claim 6, wherein the instructions further cause the processor to perform operations comprising receiving information associated with data and commands from the at least one primary device.

13. A system comprising:

one or more processors; and logic encoded in one or more tangible media for execution by the one or more processors, and when executed operable to perform operations including:

providing, at a user interaction device, one or more target functions, wherein each of the one or more target functions includes a plurality of controls that enable user interaction with at least one application associated with at least one primary device;

detecting the at least one application being launched on the at least one primary device;

determining one or more target functions, wherein each of the one or more target functions includes one or more controls that enable user interaction with the at least one application, and wherein at least one of the controls of each target function of the one or more target functions is specific to the at least one application;

receiving, from the at least one primary device, control information associated with the one or more controls of the one or more target functions;

receiving, from the at least one primary device, data information associated with the at least one application;

displaying the one or more controls of the one or more target functions on a display screen associated with the user interaction device, wherein controls of a first target function of the one or more target functions are displayed in a first functional region, and wherein controls of a second target function of the one or more target functions are displayed in a second functional region;

displaying the data information from the at least one primary device on the display screen associated with the user interaction device;

providing a visual canvas that contains one or more available widgets, wherein a first widget of the one or more available widgets corresponds to the first functional region, wherein a second widget of the one or more available widgets corresponds to the second functional region, and wherein the visual canvas expands to a size that is larger that the display screen; and enabling a user to pan the visual canvas to view and access the one or more available widgets.

14. The system of claim 13, wherein the user interaction device is a tablet computer.

15. The system of claim 13, wherein the at least one primary device is a computer system that is remote from the user interaction device.

16. The system of claim 13, wherein a user-defined configuration information configures the user interaction device for one or more target functions.

17. The system of claim 13, wherein the one or more target functions enable a user to interact with applications running on the at least one primary device.

18. The system of claim 13, wherein the one or more target functions enable a user to control applications running on the at least one primary device.

* * * * *